(12) United States Patent
Zeiser et al.

(10) Patent No.: US 10,077,027 B2
(45) Date of Patent: Sep. 18, 2018

(54) WIPER DEVICE

(71) Applicant: Robert Bosch GmbH, Stuttgart (DE)

(72) Inventors: Franz Zeiser, Schutterwald (DE); Florian Hauser, Achern (DE); Frank Moser, Kuppenheim (DE); Dominik De Rop, Lens-Saint-Remy (BE); Hervé Bratec, Wilsele (BE); Stijn Truyens, Tienen (BE); Peter Epacher, Balatonkenese (HU)

(73) Assignee: Robert Bosch GmbH, Stuttgart (DE)

( * ) Notice: Subject to any disclaimer, the term of this patent is extended or adjusted under 35 U.S.C. 154(b) by 524 days.

(21) Appl. No.: 14/509,654

(22) Filed: Oct. 8, 2014

(65) Prior Publication Data

US 2015/0096142 A1    Apr. 9, 2015

(30) Foreign Application Priority Data

Oct. 8, 2013    (DE) .................. 10 2013 220 255

(51) Int. Cl.
*B60S 1/40*    (2006.01)
*B60S 1/38*    (2006.01)

(52) U.S. Cl.
CPC ............ *B60S 1/4003* (2013.01); *B60S 1/381* (2013.01); *B60S 1/3863* (2013.01); *B60S 1/3867* (2013.01); *B60S 1/4083* (2013.01); *B60S 1/3849* (2013.01); *B60S 2001/409* (2013.01)

(58) Field of Classification Search
CPC ...... B60S 1/3806; B60S 1/381; B60S 1/3863; B60S 1/3851; B60S 1/3865; B60S 1/3867; B60S 1/3868; B60S 1/4003; B60S 1/4064; B60S 1/4083; B60S 1/409; B60S 1/4093; B60S 2001/409; B60S 2001/4093; B60S 1/3849
USPC ....................... 15/250.201, 250.32
See application file for complete search history.

(56) References Cited

U.S. PATENT DOCUMENTS

| | | | | |
|---|---|---|---|---|
| 5,319,826 A * | 6/1994 | Mower | ................ | B60S 1/3801 15/250.32 |
| 6,499,181 B1 * | 12/2002 | Kotlarski | ............. | B60S 1/3806 15/250.201 |
| 7,159,267 B2 * | 1/2007 | Son, II | ................. | B60S 1/3867 15/250.201 |
| 2002/0069475 A1 * | 6/2002 | Lee | ....................... | B60S 1/3801 15/250.201 |
| 2004/0010882 A1 * | 1/2004 | Breesch | ............... | B60S 1/3806 15/250.201 |

(Continued)

FOREIGN PATENT DOCUMENTS

| CN | 1853994 A | 11/2006 |
|---|---|---|
| DE | 10034790 | * 2/2002 |

(Continued)

*Primary Examiner* — Gary Graham
(74) *Attorney, Agent, or Firm* — Michael Best & Friedrich LLP

(57) ABSTRACT

A wiper device having a wiper blade adapter unit (10*a*-10*i*) which is provided for a releasable coupling of a wiper blade (12*a*-12*i*) to a wiper arm adapter unit (14*a*-14*i*) and which comprises at least one wiper blade adapter base member (16*a*-16*i*) which is able to be fixedly connected to the wiper blade (12*a*-12*i*). The wiper device comprises an adapter wind deflector unit (18*a*-18*i*) which is provided to deflect incident air and to press the wiper blade (12*a*-12*i*) against a vehicle windscreen (20*a*).

8 Claims, 25 Drawing Sheets

(56) References Cited

U.S. PATENT DOCUMENTS

2009/0007364 A1* 1/2009 Jarasson ............... B60S 1/386
                                                    15/250.32
2012/0180248 A1* 7/2012 Depondt ............... B60S 1/387
                                                    15/250.32

FOREIGN PATENT DOCUMENTS

| DE | 10038992     | * | 3/2002  |
|----|--------------|---|---------|
| DE | 102011007247 |   | 10/2012 |
| DE | 102011007248 |   | 10/2012 |
| FR | 2550744      |   | 2/1985  |
| FR | 2594765      | * | 8/1987  |
| FR | 2884476      | * | 10/2006 |
| WO | 2010/091757  |   | 8/2010  |

* cited by examiner

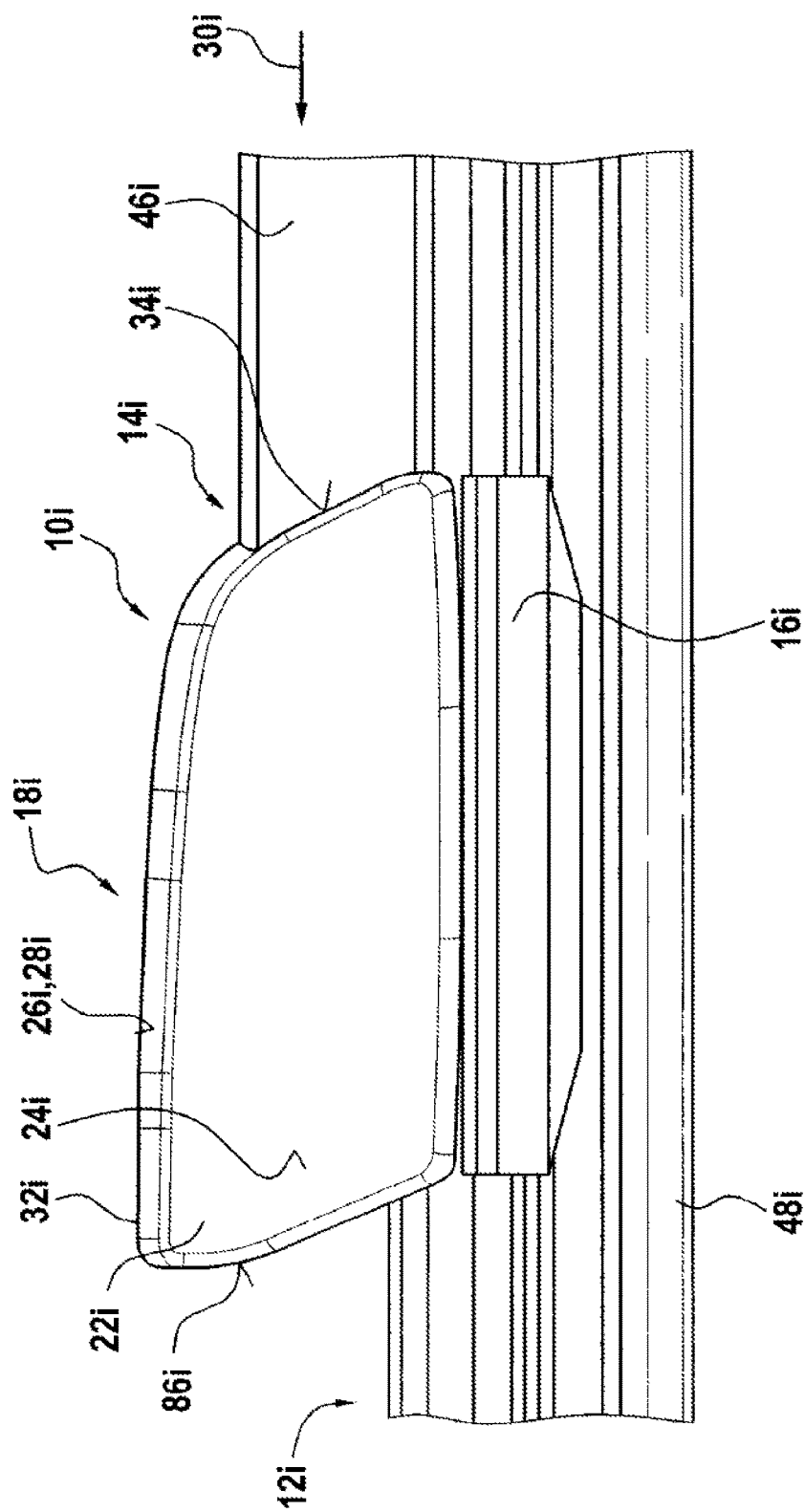

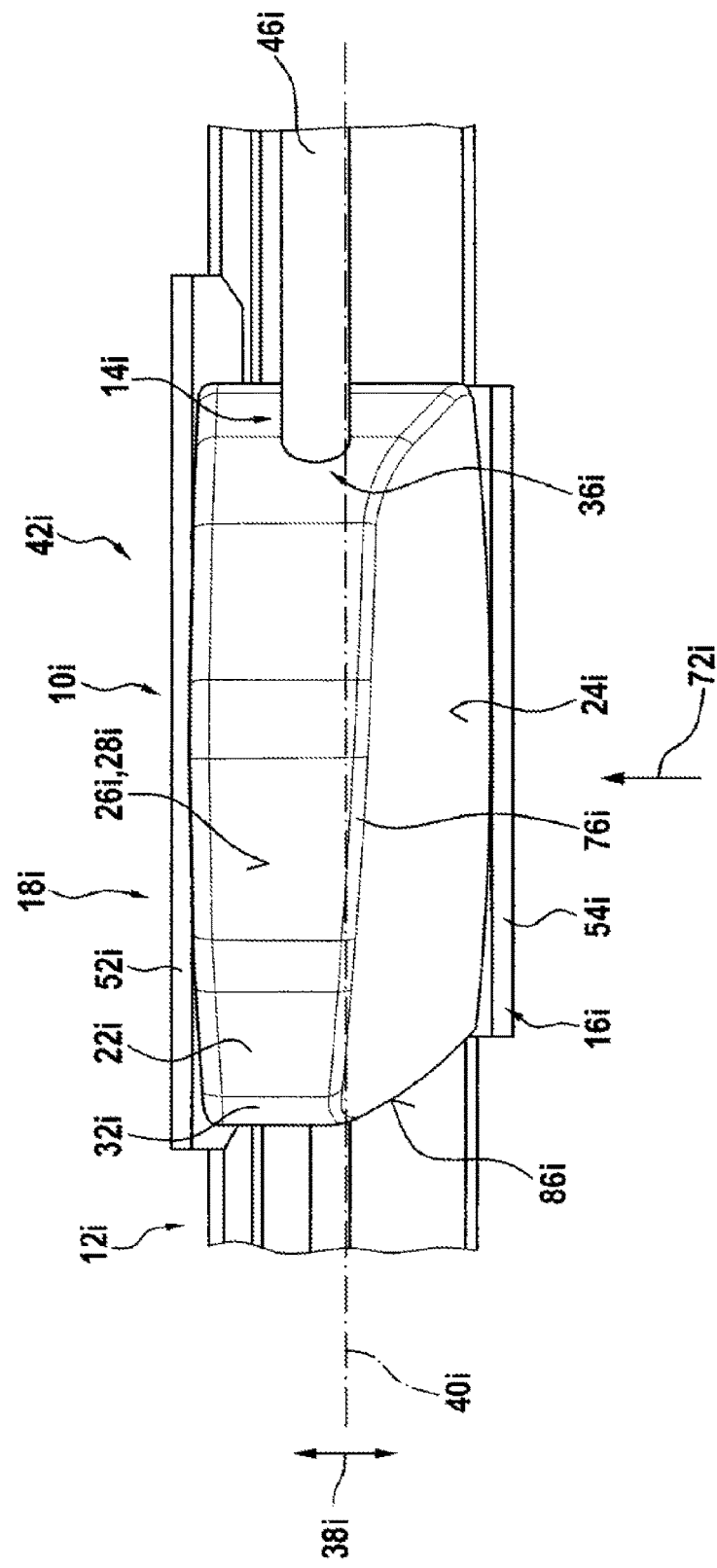

WIPER DEVICE

BACKGROUND OF THE INVENTION

The invention relates to a wiper device having a wiper blade adapter unit, which is provided for a releasable coupling of a wiper blade to a wiper arm adapter unit and which comprises at least one wiper blade adapter base member which is able to be fixedly connected to the wiper blade.

SUMMARY OF THE INVENTION

The invention is based on a wiper device having a wiper blade adapter unit which is provided for a releasable coupling of a wiper blade to a wiper arm adapter unit and which comprises at least one wiper blade adapter base member which is able to be fixedly connected to the wiper blade.

It is proposed that the wiper device comprises an adapter wind deflector unit which is provided to deflect incident air and to press the wiper blade against a vehicle windscreen. As a result, in particular in the case of high driving speeds, the wiper blade may be advantageously prevented from being lifted away from a vehicle windscreen. Thus even in the case of strong driving wind an effective wiping quality may be achieved, in particular in the region of the wiper blade adapter unit. "Wiper blade adapter unit" is intended to be understood in this context, in particular, as a unit which has a contact region with a wiper blade component and is unreleasably connected to the wiper blade component and is provided to supply a coupling region of the wiper blade component for coupling and/or contact with a wiper arm adapter unit. "Wiper arm adapter unit" is intended to be understood in this context, in particular, as a unit which has a contact region with a wiper arm component and is unreleasably connected to the wiper arm component and is provided to supply a coupling region of the wiper arm component for coupling and/or contact with a wiper blade adapter unit. "Releasably" is intended to be understood in this context, in particular, as being able to be detached by an end user without damage. "Wiper blade adapter base member" is intended to be understood in this context, in particular, as a base member of a wiper blade adapter unit which has a contact region with a wiper blade component. Preferably, the wiper blade adapter base member has a contact region with a spring rail unit. Particularly preferably, the wiper blade adapter base member has claw-like spring rail retaining elements which are provided to encompass the spring rail unit. "Able to be fixedly connected" is intended to be understood in this context, in particular, as being able to be unreleasably coupled. In particular, the wiper blade adapter base member is able to be connected to the wiper blade such that it is prevented from being released and sustaining damage. "Adapter wind deflector unit" is intended to be understood in this context, in particular, as a unit which is provided to deflect incident air on the wiper blade adapter unit and/or the wiper arm adapter unit and at the same time to press the wiper blade against the vehicle windscreen. Preferably, the adapter wind deflector unit is arranged on the wiper blade adapter unit and/or on the wiper arm adapter unit. Particularly preferably, the adapter wind deflector unit is configured integrally with at least one part of the wiper blade adapter unit and/or with at least one part of the wiper arm adapter unit. "Integrally" is intended to be understood, in particular, as connected at least by a material connection, for example by a welding process, a bonding process, an injection-molding process and/or a further process appearing meaningful to the person skilled in the art and/or advantageously molded in one piece, such as for example by production from a casting and/or by production in a single-component or multi-component injection-molding method and advantageously from a single blank. "Provided" is intended to be understood, in particular, as specifically designed and/or equipped. Since an object is provided for a specific function, this is to be understood, in particular, that the object fulfills and/or performs this specific function in at least one application state and/or operating state.

In a further embodiment of the invention, it is proposed that the adapter wind deflector unit is provided for releasable fastening to the wiper blade adapter base member. As a result, a particularly cost-effective production and simple mounting of the adapter wind deflector unit may be advantageously achieved.

It is also proposed that the adapter wind deflector unit comprises at least one adapter cover element which is provided to cover the wiper blade adapter base member at least to a large extent. As a result, the wiper blade adapter base member is advantageously protected from environmental influences. Similarly, aerodynamic interference by the wiper blade adapter base member may be avoided. "Adapter cover element" is intended to be understood in this context, in particular, as an element which is provided for covering at least a large part of a wiper blade adapter unit relative to the surroundings. Preferably, the adapter cover element is configured at least to a large extent from a plastics material. "Large extent" is intended to be understood in this context, in particular, as more than 50%, preferably more than 80%, particularly preferably more than 90%.

Moreover, it is proposed that the adapter wind deflector unit comprises at least one first wind deflection surface and an upper face which enclose an angle, in particular an internal angle, of at least 110°. As a result, at high driving speeds, a particularly high contact force of the wiper blade may be achieved in the direction of a vehicle windscreen. "Wind deflection surface" is intended to be understood in this context, in particular, as a surface, the essential function thereof being to deflect driving wind to produce a specifically oriented contact force. In particular, the wind deflection surface is configured to be contiguous. "Upper face" is intended to be understood in this context, in particular, as a side of the adapter wind deflector unit remote from the wiper lip. Preferably, the upper face extends at least substantially parallel to a wiping plane, in particular to a vehicle windscreen to be wiped. In particular, the upper face may have at least one opening for receiving a wiper arm adapter unit. "At least substantially" is intended to be understood in this context, in particular, that an angular deviation is, in particular, less than 20°, preferably less than 10°, particularly preferably less than 5° and quite particularly preferably less than 2°. "Remote from the wiper lip" is intended to be understood in this context, in particular, as remote from a wiper lip of the wiper blade. "Wiper lip" is intended to be understood in this context, in particular, as a resilient lip which is provided to wipe a vehicle windscreen in at least one operating state with a wiper edge.

In a further embodiment of the invention, it is proposed that the adapter wind deflector unit comprises at least one first wind deflection surface and at least one second wind deflection surface which is adjacent to the at least one first wind deflection surface. As a result, at high driving speeds a particularly high contact pressure of the wiper blade may be achieved in the direction of a vehicle windscreen. Preferably, the at least one first wind deflection surface and the at least one second wind deflection surface are adjacent to one another on one edge. Preferably, the at least one first wind deflection surface and the at least one second wind deflection surface enclose an angle, in particular an obtuse angle.

Moreover, it is proposed that the adapter wind deflector unit comprises a projection on an upper face, viewed in a longitudinal direction. As a result, even when the wiper blade is deflected, at high driving speeds a particularly high contact pressure of the wiper blade may be achieved in the direction of a vehicle windscreen. "Longitudinal direction" is intended to be understood in this context, in particular, as a direction which extends at least substantially parallel to a main longitudinal dimension of the wiper blade. "Main longitudinal dimension" is intended to be understood in this context, in particular, as the greatest possible dimension. "Projection" is intended to be understood in this context, in particular, as a projection, wherein at least one surface of the projection, in particular of a vehicle windscreen to be wiped, encloses an acute angle with a wiping plane.

In a further embodiment of the invention, it is proposed that the adapter wind deflector unit comprises a longitudinal flow surface which is provided to deflect air flowing at least substantially in a longitudinal direction in order to press the wiper blade against a vehicle windscreen. "Longitudinal flow surface" is intended to be understood in this context, in particular, as a surface which is provided to deflect at least substantially air flowing in a longitudinal direction. Preferably, the longitudinal flow surface is oriented at least partially in the direction of a wiper blade inner circular path. "Wiper blade inner circular path" is intended to be understood in this context, in particular, as a circular path on which a free end of the wiper blade, which faces an axis of oscillation of the drive, moves during a wiping motion. As a result, even when the wiper blade is deflected, at high driving speeds, a particularly high contact pressure of the wiper blade may be achieved in the direction of a vehicle windscreen.

A particularly compact design of the wiper blade adapter unit may be achieved if the wiper blade adapter base member comprises a wiper arm receiver which, viewed in a wiping direction, is arranged offset from a wiper blade adapter center. "Wiping direction" is intended to be understood in this context, in particular, as a tangential direction in which in an operating state the wiper blade is passed over the vehicle windscreen to be wiped. "Wiper arm receiver" is intended to be understood in this context, in particular, as a receiver which is provided to supply a receiving region for coupling a wiper arm adapter unit. Preferably, a geometric mid-point of the wiper arm receiver is arranged offset from a wiper blade adapter center. "Wiper blade adapter center" is intended to be understood in this context, in particular, as a plane which extends at least substantially perpendicular to a wiping direction and extends through a geometric mid-point and/or a center of gravity of a wiper blade adapter unit.

If the wiper arm receiver is arranged offset in the direction of a leeward side of the adapter wind deflector unit, the wiper blade adapter unit may be of particularly compact design. "Leeward side" is intended to be understood in this context, in particular, as a side remote from the wind, in particular, remote from the driving wind.

Particularly simple mounting of the wiper device may be achieved if the wiper device comprises a latching unit which is provided to latch the adapter wind deflector unit to the wiper blade adapter unit. "Latching unit" is intended to be understood in this context, in particular, as a unit which has at least one latching means which is provided to be resiliently deflected from an initial position during a mounting procedure and to be resiliently moved at least partially back into the initial position when a final mounted position is reached.

The wiper blade device according to the invention is not intended not to be limited here to the above-described application and embodiment. In particular, the device according to the invention for fulfilling a function described therein may have a number of individual elements, components and units deviating from a number cited herein.

BRIEF DESCRIPTION OF THE DRAWINGS

Further advantages are revealed from the following description of the drawings. In the drawings, nine exemplary embodiments of the invention are shown. The drawings, the description and the claims contain numerous features in combination. The person skilled in the art will also expediently consider the features individually and combine them to form further meaningful combinations.

In the drawings:

FIG. 29 shows the wiper device according to FIG. 27 in a side view and FIG. 30 shows the wiper device according to FIG. 27 in a plan view.

DETAILED DESCRIPTION

Figure 1:
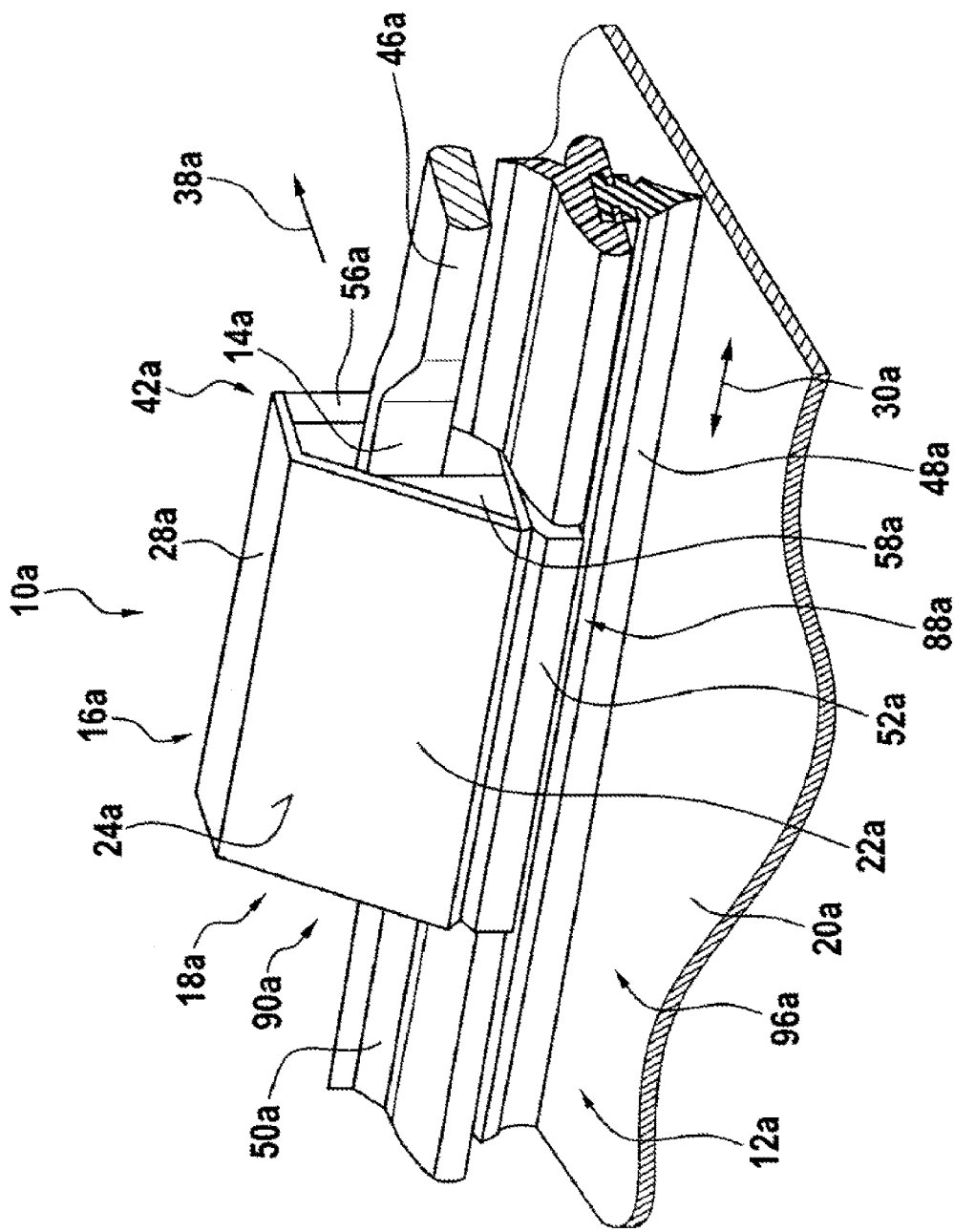
FIG. 1 shows a wiper device according to the invention having a wiper blade adapter unit, a wiper blade and a wiper arm in a coupled state in a schematic view.

FIG. 1 shows a wiper device having a wiper blade adapter unit 10a and an adapter wind deflector unit 18a and a vehicle windscreen 20a. FIG. 1 also shows a wiper blade 12a. The wiper blade 12a bears directly against the vehicle windscreen 20a. The wiper blade 12a has a wiper blade spoiler 50a, two spring rails, not visible further, and a wiper lip 48a. The wiper blade 12a further comprises the wiper device. In an operating state, the wiper blade 12a wipes over the vehicle windscreen 20a of a vehicle, not visible further. The wiper lip 48a of the wiper blade 12a is provided during operation to bear against the vehicle windscreen 20a and to wipe over said windscreen. The wiper lip 48a is retained via the spring rails in the wiper blade spoiler 50a of the wiper blade 12a.

The wiper blade adapter unit 10a is provided for a releasable coupling of the wiper blade 12a to a wiper arm adapter unit 14a. The wiper blade adapter unit 10a comprises a wiper blade adapter base member 16a. The wiper blade adapter base member 16a is able to be fixedly connected to the wiper blade 12a. The wiper blade adapter base member 16a is fixedly connected to the wiper blade 12a. The wiper blade adapter base member 16a is welded to the spring rails of the wiper blade 12a, not visible further. The wiper blade adapter base member 16a has a base region 88a. The wiper blade adapter base member 16a is fixedly connected to the wiper blade 12a via the base region 88a. The base region 88a has two claw-like spring rail retaining elements 52a, 54a. The spring rail retaining elements 52a, 54a are provided to encompass the spring rails of the wiper blade 12a, not visible further.

The wiper device has the wiper arm adapter unit 14a. The wiper arm adapter unit 14a is assigned to a wiper arm 46a. The wiper arm 46a connects the wiper blade 12a to the motor vehicle, not visible further. The wiper blade 12a and the wiper arm 46a form a system.

Moreover, the wiper blade adapter base member 16a has a receiver region 90a. The receiver region 90a is integrally configured with the base region 88a. The receiver region 90a of the wiper blade base member 16a has two side walls 56a, 58a arranged parallel to one another. The side walls 56a, 58a in each case have a main plane of extension parallel to the longitudinal direction 30a and perpendicular to a wiping direction 38a. The side walls 56a, 58a of the receiver region 90a protrude in each case perpendicular from a base region 88a. The first side wall 56a facing a leeward side 42a, viewed in the wiping direction 38a, is directly adjacent to an outer edge of the base region 88a. The second side wall 58a, however, is arranged in the vicinity of a wiper blade adapter center 40a of the wiper blade adapter base member 16a. The wiper blade adapter center 40a of the wiper blade adapter base member 16a is formed by a geometric mid-point of the wiper blade adapter base member 16a. Moreover, the receiver region 90a comprises a pin 92a. The pin 92a is arranged between the side walls 56a, 58a and extends parallel to the wiping direction 38a. The pin 92a is formed by a metal pin. Moreover, the wiper blade adapter base member 16a comprises a wiper arm receiver 36a. The wiper arm receiver 36a is arranged in the receiver region 90a of the wiper blade adapter base member 16a. The wiper arm receiver 36a is formed partially by the pin 92a. The pin 92a serves for receiving the wiper arm adapter unit 14a of the wiper arm 46a. To this end, the wiper arm adapter unit 14a comprises an L-shaped slot 94a into which the pin 92a may be introduced. The L-shaped slot 94a has a downwardly open end in order to introduce the pin 92a. Moreover, the L-shaped slot 94a has a closed end. The closed end is located relative to the open end in a front end of the wiper arm 46a. As a result, the pin 92a is pressed in the direction of the closed end by the centrifugal forces acting during operation. The wiper arm adapter unit 14a is also retained by the adapter wind deflector unit 18a in a covered state of the wiper arm adapter base member 16a. Viewed in the wiping direction 38a, the wiper arm receiver 36a is arranged offset from the wiper blade adapter center 40a. The wiper arm receiver 36a is arranged offset in the direction of a leeward side 42a of the adapter wind deflector unit 18a. More specifically, a geometric mid-point of the wiper arm receiver 36a is arranged offset from the wiper blade adapter center 40a. The geometric mid-point of the wiper arm receiver 36a is arranged offset in the leeward direction to a plane which extends perpendicular to the wiping direction 38a and through the wiper blade adapter center 40a.

Moreover, the wiper device comprises the adapter wind deflector unit 18a. The adapter wind deflector unit 18a is provided to deflect incident air and to press the wiper blade 12a against the vehicle windscreen 20a. The adapter wind deflector unit 18a is provided for a releasable fastening to the wiper blade adapter base member 16a. The adapter wind deflector unit 18a is latched to the wiper blade adapter base member 16a, not visible further. In principle, however, a further fastening of the adapter wind deflector unit 18a to the wiper blade adapter base member 16a might also be conceivable, appearing meaningful to the person skilled in the art. The adapter wind deflector unit 18a further comprises an adapter cover element 22a. The adapter cover element 22a is provided to cover the wiper blade adapter base member 16a to a large extent. The adapter wind deflector unit 18a covers the wiper blade adapter base member 16a. The adapter wind deflector unit 18a in each case bears against the ends of the side walls 56a, 58a of the receiver region 90a remote from the base region 88a. Moreover, the adapter wind deflector unit 18a on a windward side 96a bears directly against an outer edge of the base region 88a. The adapter wind deflector unit 18a further comprises a first wind deflection surface 24a and an upper face 28a. The adapter cover element 22a has the first wind deflection surface 24a and the upper face 28a. The wind deflection surface 24a and the upper face 28a enclose an angle of 110°. The wind deflection surface 24a and the upper face 28a enclose an internal angle of 110°. The internal angle 98a spans the material inner faces of the wind deflection surface 24a and the upper face 28a. The internal angle 98a is located in a plane perpendicular to the longitudinal direction 30a. The wind deflection surface 24a of the adapter wind deflector unit 18a, in this case on the windward side 96a, bears directly against an outer edge of the base region 88a. Moreover, an inner face of the wind deflection surface 24a of the adapter wind deflector unit 18a bears against the second side wall 58a of the receiver region 90a of the wiper blade adapter base member 16a. In this case, the end of the second side wall 58a remote from the base region 88a has a chamfer which corresponds to an angle of the wind deflection surface 24a relative to a wiping plane. The wiping plane extends parallel to the longitudinal direction 30a and parallel to the wiping direction 38a. The wind deflection surface 24a is angled by approximately 70° relative to the wiping plane. A main plane of extension of the wind deflection surface 24a is angled by 70° relative to the wiping plane. The wind deflection surface 24a extends approximately parallel to the longitudinal direction 30a. The upper face 28a of the adapter wind deflector unit 18a extends approximately parallel to the longitudinal direction 30a and approximately parallel to the wiping direction 38a. The upper face 28a extends approximately parallel to the wiping plane. A main plane of extension of the upper face 28a extends parallel to the wiping plane. The wiping deflection surface 24a of the adapter wind deflector unit 18a is substantially larger than the upper face 28a of the adapter wind deflector unit 18a. The wind deflection surface 24a is approximately twice the size of the upper face 28a. In principle, however, a different ratio of the wind deflection surface 24a to the upper face 28a might also be conceivable, appearing meaningful to the person skilled in the art.

Figure 2:
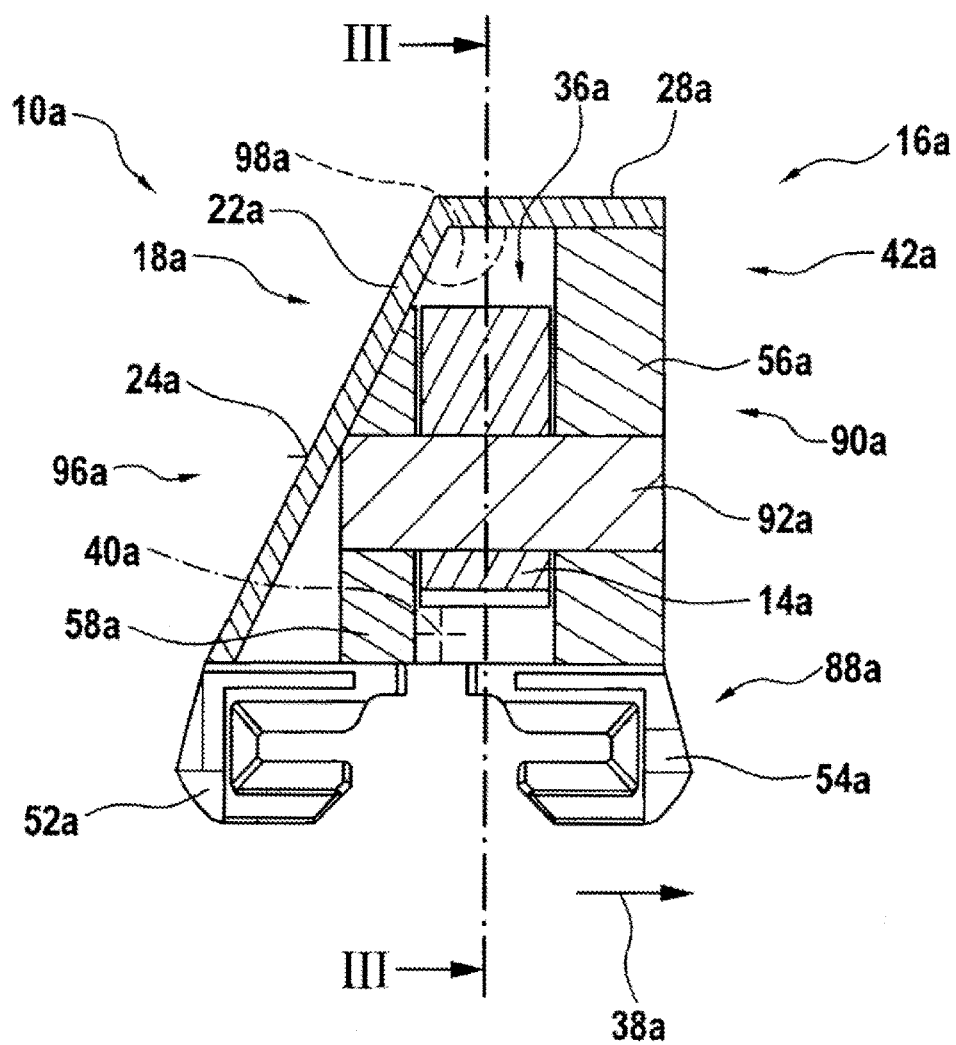
FIG. 2 shows the wiper device according to the invention having the wiper blade adapter unit and the wiper arm in a schematic partially sectional view along the cutting line II.
Figure 3:
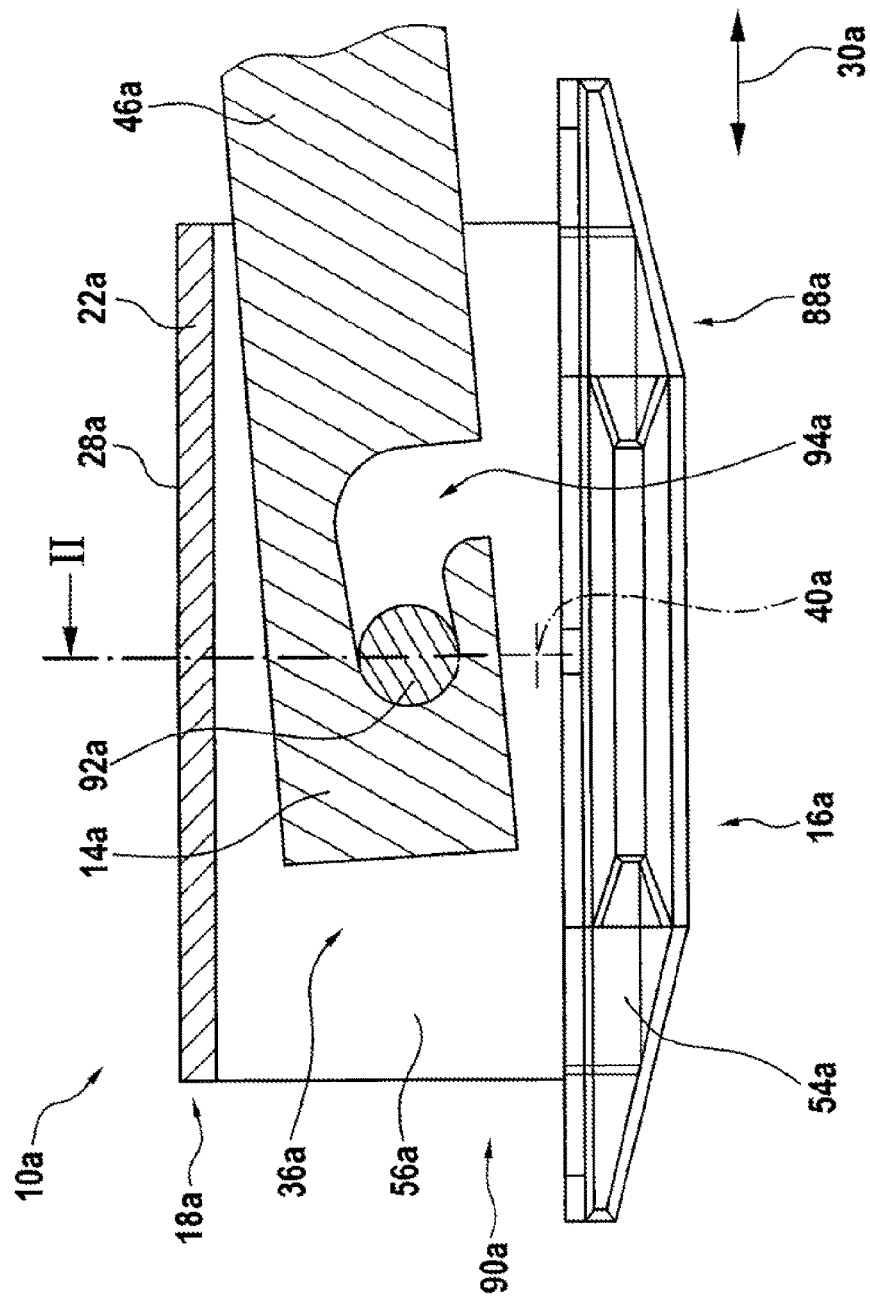
FIG. 3 shows the wiper device according to the invention having the wiper blade adapter unit and the wiper arm in a further schematic partially sectional view along the cutting line III.

In FIGS. 1 to 30, nine further exemplary embodiments of the invention are shown. The following descriptions and the drawings are substantially limited to the differences between the exemplary embodiments, wherein with regard to components which are denoted the same, in particular with regard to components with the same reference numerals, in principle reference may also be made to the drawings and/or the description of the other exemplary embodiments, in particular FIGS. 1 to 3. To differentiate between the exemplary embodiments, the letter a is placed after the reference numerals of the exemplary embodiment in FIGS. 1 to 3. In the exemplary embodiments of FIGS. 4 to 30, the letter a is replaced by the letters b to i.

Figure 4:
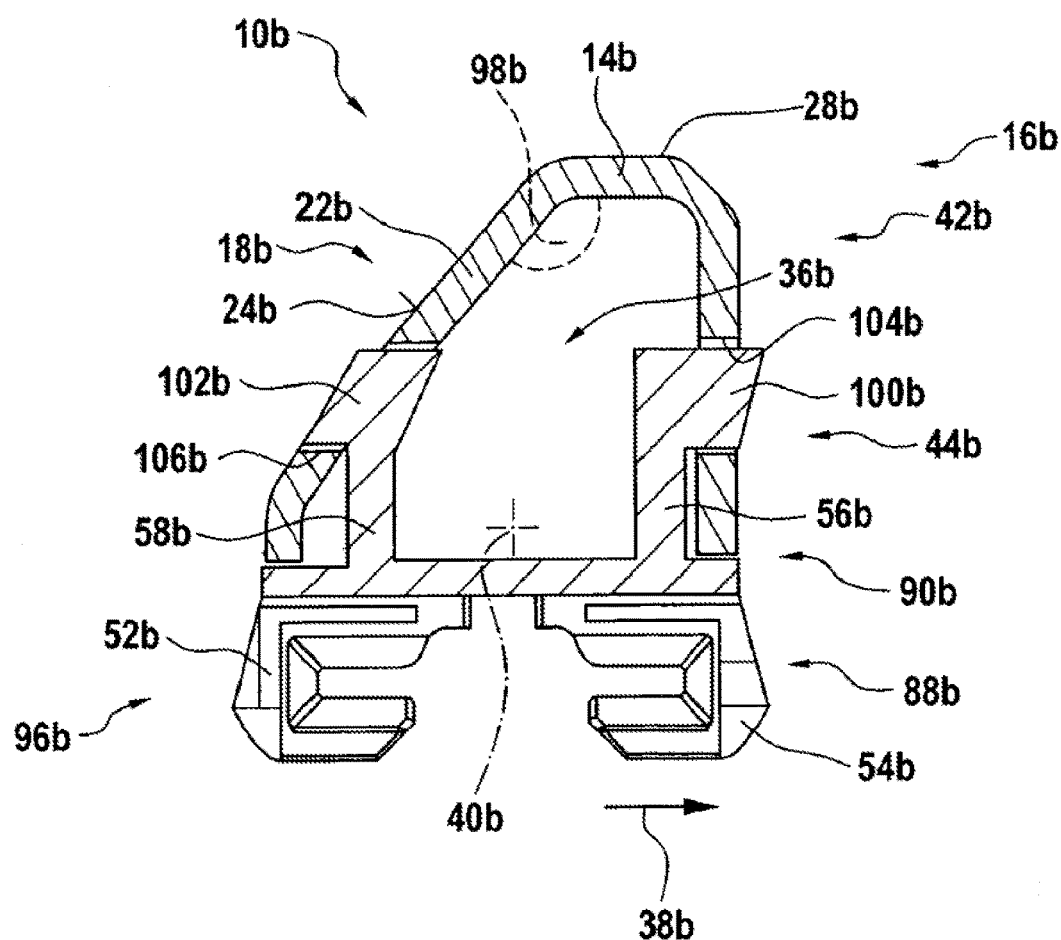
FIG. 4 shows an alternative wiper device according to the invention having a wiper blade adapter unit and a wiper arm in a schematic partially sectional view along the cutting line IV.
Figure 5:
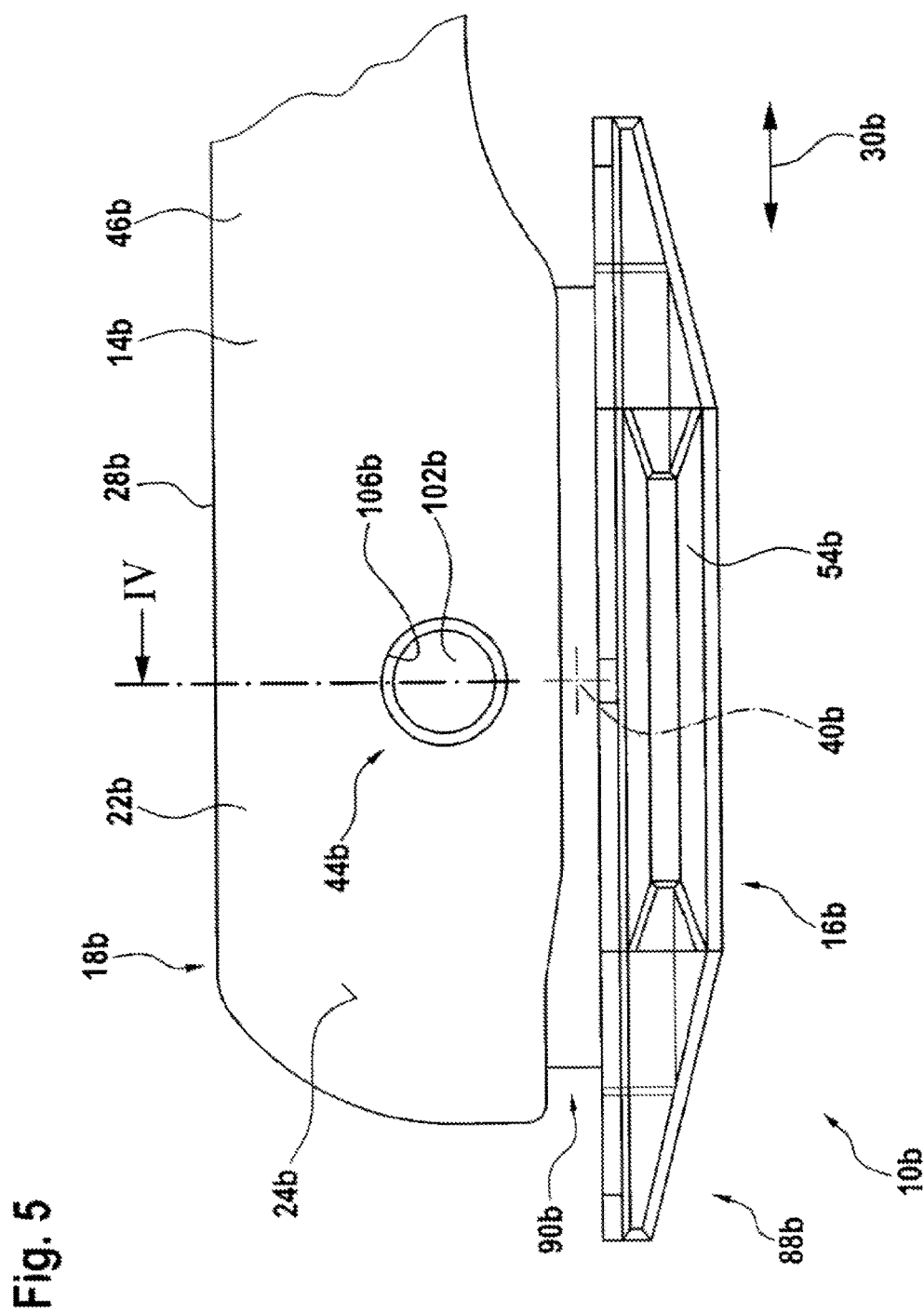
FIG. 5 shows the alternative wiper device according to the invention having the wiper blade adapter unit and the wiper arm in a schematic view.

FIG. 4 shows a wiper device having a wiper blade adapter unit 10b and an adapter wind deflector unit 18b. The wiper blade adapter unit 10b comprises a wiper blade adapter base member 16b. The wiper blade adapter base member 16b has a base region 88b.

Moreover, the wiper blade adapter base member 16b has a receiver region 90b. The receiver region 90b is integrally configured with the base region 88b. The receiver region 90b of the wiper blade base adapter 16b has two side walls 56b, 58b arranged parallel to one another. The side walls 56b, 58b have in each case a main plane of extension parallel to the longitudinal direction 30b and perpendicular to a wiping direction 38b. The side walls 56b, 58b of the receiver region 90b protrude in each case perpendicular from a base region 88b. On the ends of the side walls 56b, 58b remote from the base region 88b, the side walls 56b, 58b in each case comprise a latching element 100b, 102b. The latching elements 100b, 102b of the side walls 56b, 58b are in each case outwardly oriented, viewed in the longitudinal direction 30b. Moreover, the wiper blade adapter base member 16b comprises a wiper arm receiver 36b. The wiper arm receiver 36b is arranged in the receiver region 90b of the wiper blade adapter base member 16b. The wiper arm receiver 36b is partially formed from the latching elements 100b, 102b. The latching elements 100b, 102b serve for receiving a wiper arm adapter unit 14b of a wiper arm 46b. The wiper arm adapter unit 14b has to this end two latching recesses 104b, 106b. The latching recesses 104b, 106b are arranged on opposing sides of the wiper arm adapter unit 14b. The latching elements 100b, 102b of the wiper arm receiver 36b are latched in a mounted state in the latching recesses 104b, 106b of the wiper arm adapter unit 14b. The wiper arm receiver 36b, viewed in the wiping direction 38b, is arranged offset from the wiper blade adapter center 40b. The wiper arm receiver 36b is arranged offset in the direction of a leeward side 42b of the adapter wind deflector unit 18b. More specifically, a geometric mid-point of the wiper arm receiver 36b is arranged offset from the wiper blade adapter center 40b. The geometric mid-point of the wiper arm receiver 36b is arranged offset in the leeward direction from a plane which extends perpendicular to the wiping direction 38b and through the wiper blade adapter center 40b (FIG. 4, 5).

Moreover, the wiper device has the adapter wind deflector unit 18b. The adapter wind deflector unit 18b is provided to deflect incident air and to press a wiper blade 12b against the vehicle windscreen 20b. The adapter wind deflector unit 18b is provided for releasable fastening to the wiper blade adapter base member 16b. Moreover, the wiper device comprises a latching unit 44b. The latching unit 44b is provided to latch the adapter wind deflector unit 18b to the wiper blade adapter unit 10b. The latching unit 44b is formed by the latching elements 100b, 102b of the wiper arm receiver 36b and the latching recesses 104b, 106b of the wiper arm adapter unit 14b. In principle, however, a further fastening of the adapter wind deflector unit 18a on the wiper blade adapter unit 10b might be also conceivable, appearing meaningful to the person skilled in the art. The adapter wind deflector unit 18b is integrally configured with the wiper arm adapter unit 14b. The adapter wind deflector unit 18b and the wiper arm adapter unit 14b are configured integrally. The adapter wind deflector unit 18b is produced in the wiper arm adapter unit 14b. The adapter wind deflector unit 18b covers the wiper blade adapter base member 16b. The adapter wind deflector unit 18b in each case bears approximately against the two external edges of the base region 88b. The adapter wind deflector unit 18b further comprises a first wind deflection surface 24b and an upper face 28b. The adapter wind deflector unit 18b further comprises a rear face 86b.

The wind deflection surface 24b, the upper face 28b and the rear face 86b are formed from an outer surface of the wiper arm adapter unit 14b. The wind deflection surface 24b and the upper face 28b enclose an angle of 110°. The wind deflection surface 24b and the upper face 28b enclose an internal angle of 110°. The wind deflection surface 24b is adjacent to the upper face 28b and the upper face 28b is adjacent to the rear face 86b. In each case, a rounded transition is arranged between the surfaces (FIG. 4, 5).

Figure 6:
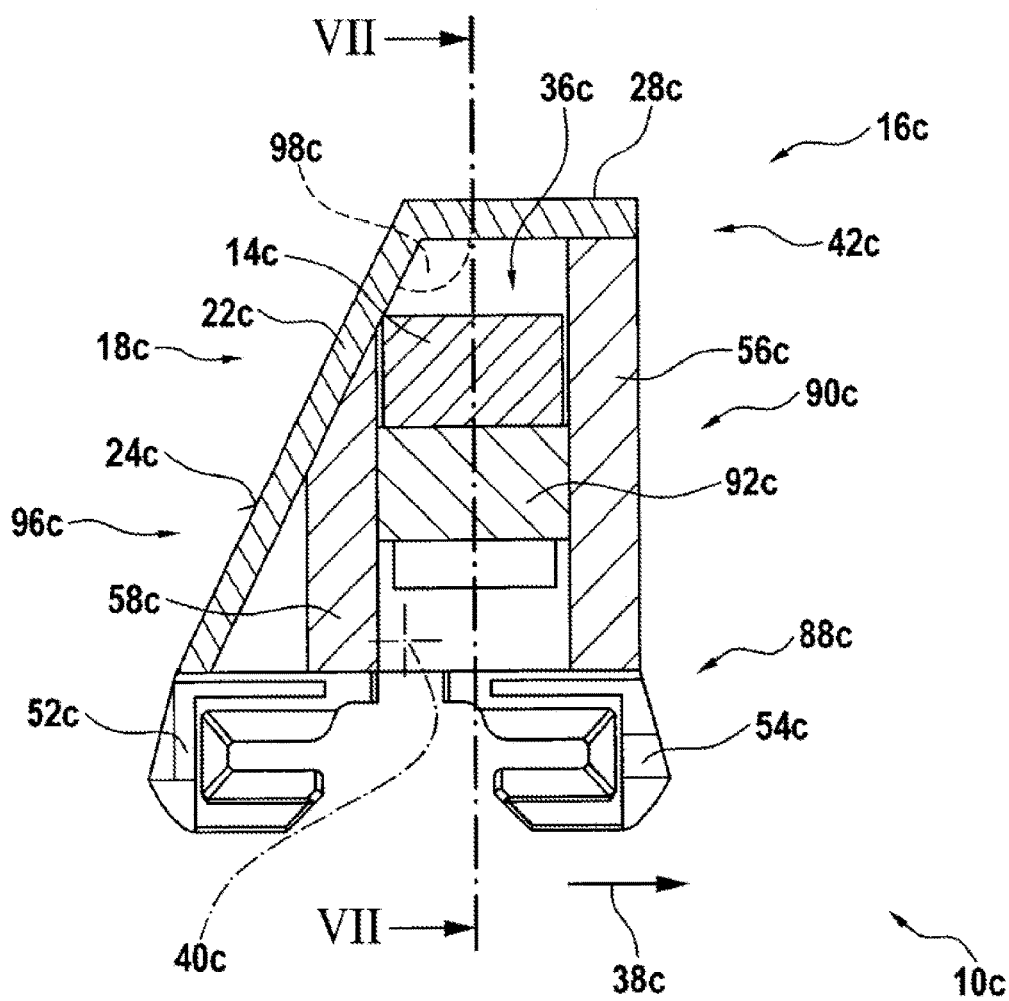
FIG. 6 shows a further alternative wiper device according to the invention having a wiper blade adapter unit and a wiper arm in a schematic partially sectional view along the cutting line VI.
Figure 7:
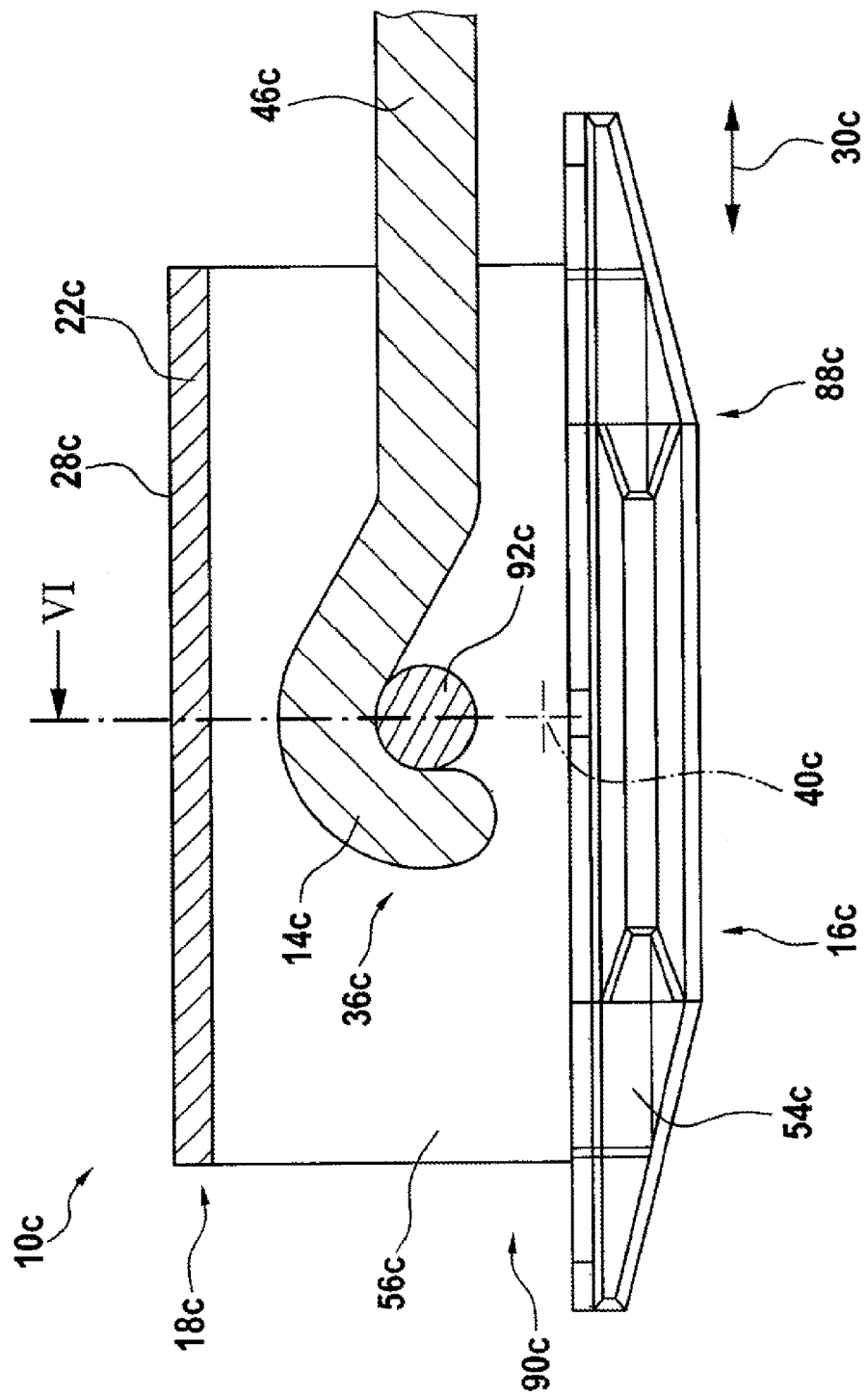
FIG. 7 shows a further alternative wiper device according to the invention having the wiper blade adapter unit and the wiper arm in a further schematic partially sectional view along the cutting line VII.
Figure 8:
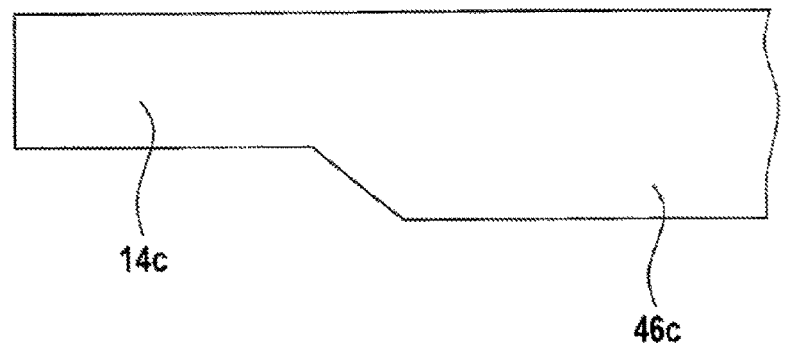
FIG. 8 shows a plan view of a wiper arm adapter unit of the wiper arm in a schematic view.

FIG. 6 shows a wiper device having a wiper blade adapter unit 10c and an adapter wind deflector unit 18c. The wiper blade adapter unit 10c comprises a wiper blade adapter base member 16c. The wiper blade adapter base member 16c has a base region 88c.

Moreover, the wiper blade adapter base member 16c has a receiver region 90c. The receiver region 90c is integrally formed with the base region 88c. The receiver region 90c of the wiper blade base adapter 16c has two side walls 56c, 58c arranged parallel to one another. The side walls 56c, 58c have in each case a main plane of extension parallel to a longitudinal direction 30c and perpendicular to a wiping direction 38c. The side walls 56c, 58c of the receiver region 90c protrude in each case perpendicular from a base region 90c. In this case, the first side wall 56c facing a leeward side 42c is directly adjacent to an outer edge of the base region 88c, viewed in the wiping direction 38c. The second side wall 58c, however, is arranged in the vicinity of a wiper blade adapter center 40c of the wiper blade adapter base member 16c. The wiper blade adapter center 40c of the wiper blade adapter base member 16c is formed by a geometric mid-point of the wiper blade adapter base member 16c. Moreover, the receiver region 90c comprises a pin 92c. The pin 92c is arranged between the side walls 56c, 58c and extends parallel to the wiping direction 38c. The pin 92c is formed by a metal pin. Moreover, the wiper blade adapter base member 16c comprises a wiper arm receiver 36c. The wiper arm receiver 36c is arranged in the receiver region 90c of the wiper blade adapter base member 16c. The wiper arm receiver 36c is partially formed by the pin 92c. The pin 92c serves for receiving the wiper arm adapter unit 14c of the wiper arm 46c. The wiper arm adapter unit 14c to this end has a hook-shaped end which is provided to encompass the pin 92c. The wiper arm adapter unit 14c may be pushed onto the pin 92c in an uncovered state of the wiper blade adapter base body 16c. Subsequently, the wiper arm adapter base member 16c may be covered by the adapter wind deflector unit 18c and the wiper arm adapter unit 14c retained thereby in the wiper arm adapter base member 16c. Viewed in a plane parallel to the longitudinal direction 30c and parallel to the wiping direction 38c, the wiper arm adapter unit 14c in a region of the hook-shaped end is narrow relative to the remaining wiper arm 46c. As a result, it is possible to insert the wiper arm adapter unit 14c in a simple manner into the receiver region 90c. Moreover, the receiver region 90c may be kept narrow as a result. Moreover, the wiper arm adapter unit 14c may consequently be prevented from sliding forward in the receiver region 90c. The wiper arm receiver 36c, viewed in the wiping direction 38c, is arranged offset from the wiper blade adapter center 40c. The wiper arm receiver 36c is arranged offset in the direction of a leeward side 42c of the adapter wind deflector unit 18c. More specifically, a geometric mid-point of the wiper arm receiver 36c is arranged offset from the wiper blade adapter center 40c. The geometric mid-point of the wiper arm receiver 36c is arranged offset in the leeward direction from a plane which extends perpendicular to the wiping direction 38c and through the wiper blade adapter center 40c (FIG. 6, 7, 8).

Figure 9:
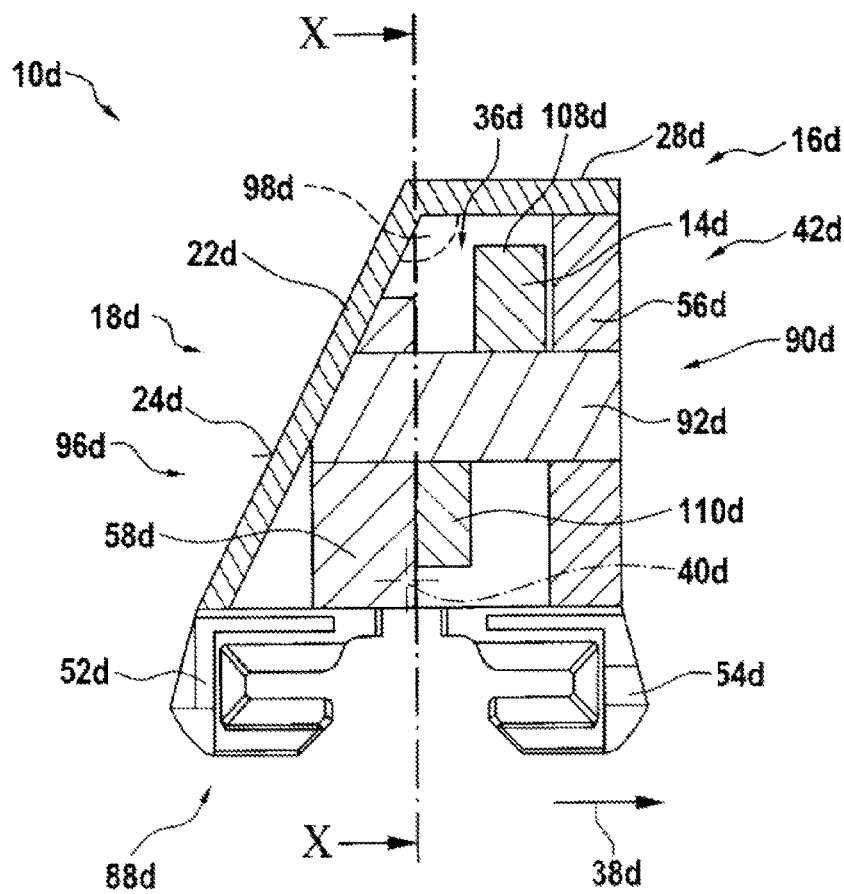
FIG. 9 shows a further alternative wiper device according to the invention having a wiper blade adapter unit and a wiper arm in a schematic partially sectional view along the cutting line IX.
Figure 10:
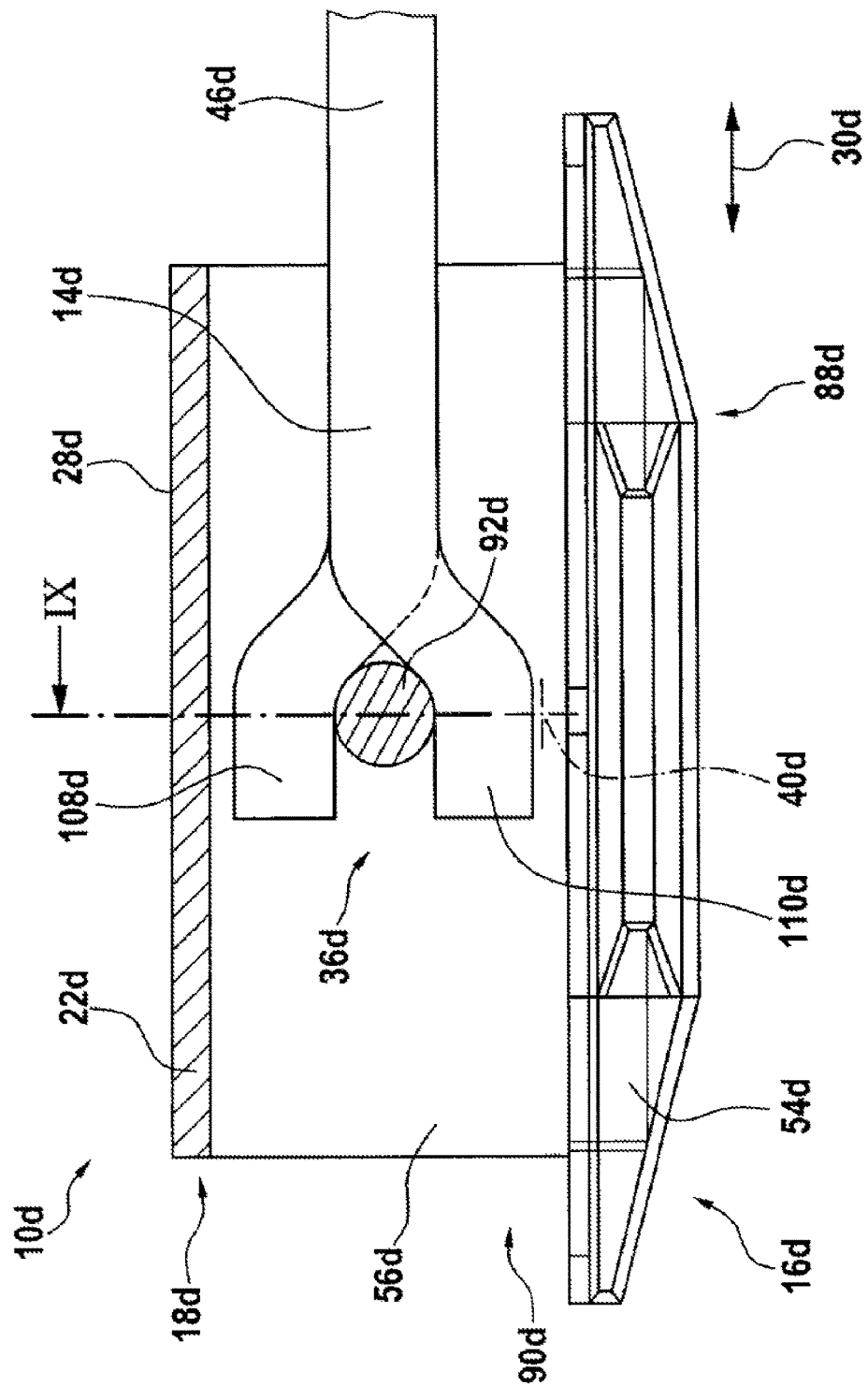
FIG. 10 shows the further alternative wiper device according to the invention having the wiper blade adapter unit and the wiper arm in a further schematic partially sectional view along the cutting line X.
Figure 11:
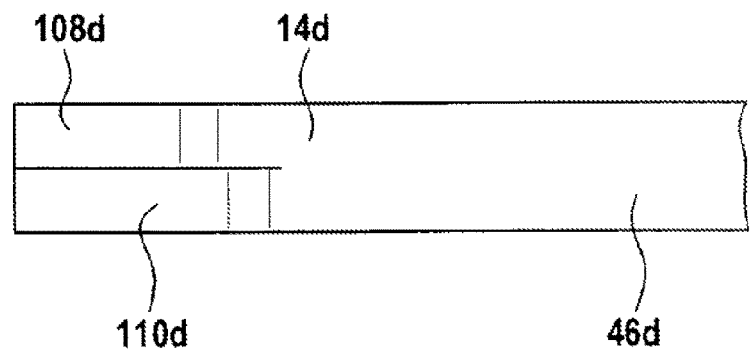
FIG. 11 shows a plan view of a wiper arm adapter unit of the wiper arm in a schematic view.

FIG. 9 shows a wiper device with a wiper blade adapter unit 10d and an adapter wind deflector unit 18d. The wiper blade adapter unit 10d comprises a wiper blade adapter base member 16d. The wiper blade adapter base member 16d has a base region 88d.

Moreover, the wiper blade adapter base member 16d has a receiver region 90d. The receiver region 90d is integrally formed with the base region 88d. The receiver region 90d of the wiper blade base adapter 16d has two side walls 56d, 58d arranged parallel to one another. The side walls 56d, 58d in each case have a main plane of extension parallel to a longitudinal direction 30d and perpendicular to a wiping direction 38d. The side walls 56d, 58d of the receiver region 90d protrude in each case perpendicular from a base region 88d. In this case, the first side wall 56d facing a leeward side 42d is directly adjacent, viewed in the wiping direction 38d, to an outer edge of the base region 88d. The second side wall 58d is, however, arranged in the vicinity of a wiper blade adapter center 40a of the wiper blade adapter base member 16d. The wiper blade adapter center 40a of the wiper blade adapter base member 16d is formed from a geometric mid-point of the wiper blade adapter base member 16d. Moreover, the receiver region 90d has a pin 92d. The pin 92d is arranged between the side walls 56d, 58d and extends parallel to the wiping direction 38d. The pin 92d is configured to be magnetic. Moreover, the wiper blade adapter base member 16d comprises a wiper arm receiver 36d. The wiper arm receiver 36d is arranged in the receiver region 90d of the wiper blade adapter base member 16d. The wiper arm receiver 36d is formed partially by the pin 90d. The pin 90d serves for receiving the wiper arm adapter unit 14d of the wiper arm 46d. To this end, the wiper arm adapter unit 14d has at the end remote from the remaining wiper arm 46d a region divided in the longitudinal direction 30d. The two ends 108d, 110d of the divided region in this case are bent in a U-shape, viewed in a plane parallel to the longitudinal direction 30d and perpendicular to a wiping direction 38d, wherein each of the two ends 108d, 110d in each case forms half of the U-shape. The wiper arm adapter unit 14d is configured to be magnetic. The wiper arm adapter unit 14d is magnetically attracted by the pin 92d as a result and thus retained there. Alternatively or additionally, however, it might also be conceivable for latching lugs to be arranged on the wiper arm adapter unit 14d which are latched behind the pin 92d. In principle, however, other retaining mechanisms which appear meaningful to the person skilled in the art are also conceivable. The wiper arm receiver 36d, viewed in the wiping direction 38d, is arranged offset from the wiper blade adapter center 40d. The wiper arm receiver 36d is arranged offset in the direction of a leeward side 42d of the adapter wind deflector unit 18d. More specifically, a geometric mid-point of the wiper arm receiver 36d is arranged offset from the wiper blade adapter center 40d. The geometric mid-point of the wiper arm receiver 36d is arranged offset in the leeward direction from a plane which extends perpendicular to the wiping direction 38d and through the wiper blade adapter center 40d (FIG. 9, 10, 11).

Figure 12:
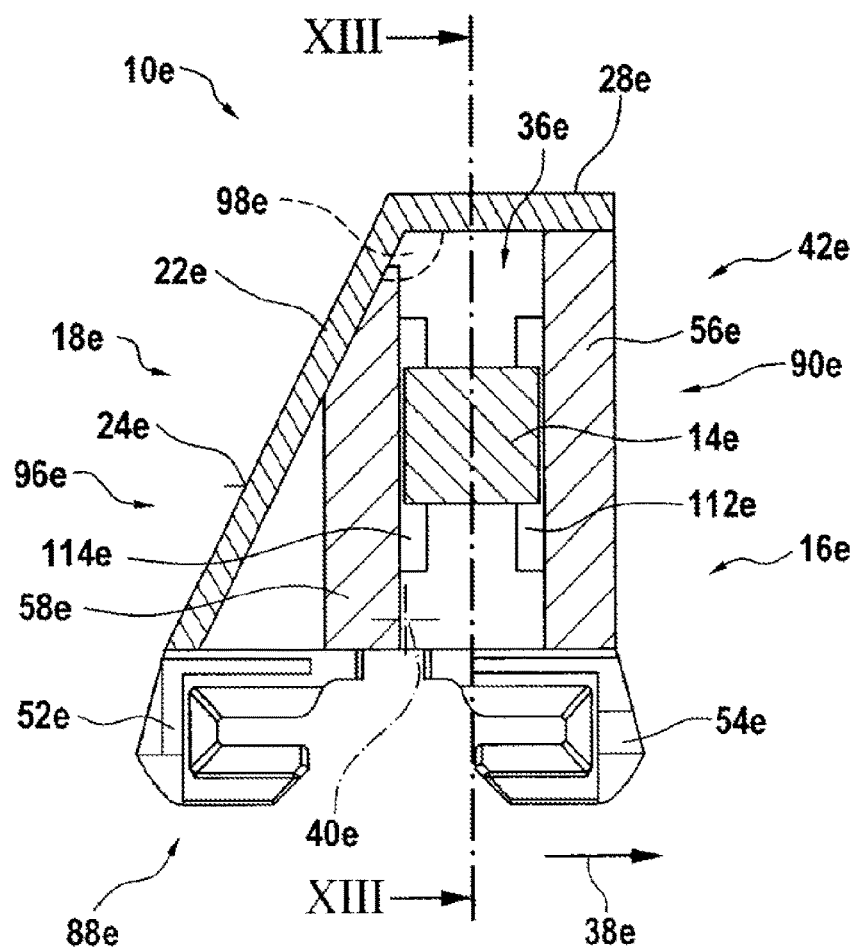
FIG. 12 shows a further alternative wiper device according to the invention having a wiper blade adapter unit and a wiper arm in a schematic partially sectional view along the cutting line XII.
Figure 13:
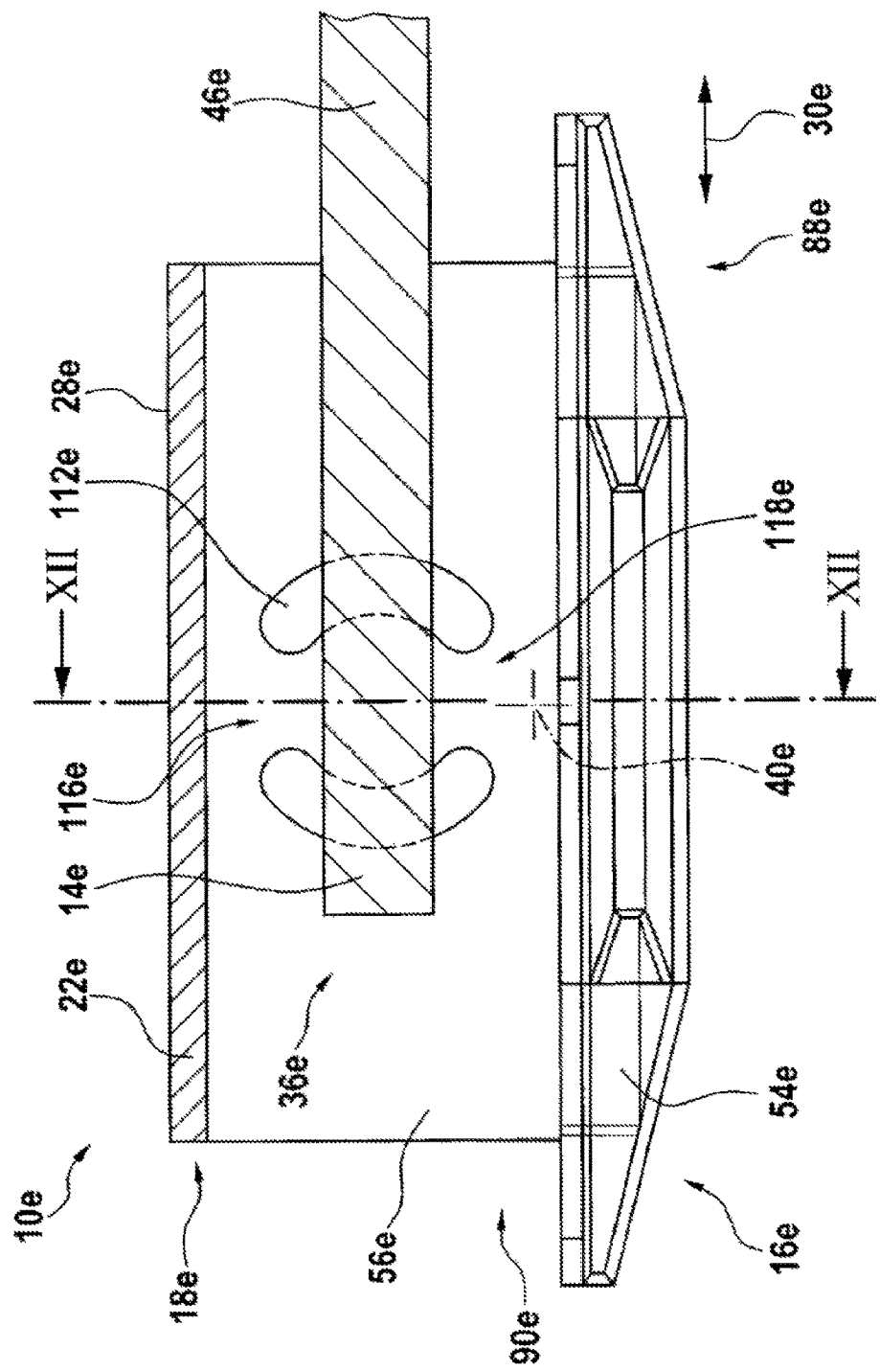
FIG. 13 shows the further alternative wiper device according to the invention having a wiper blade adapter unit and the wiper arm in a further schematic partially sectional view along the cutting line XIII.
Figure 14:
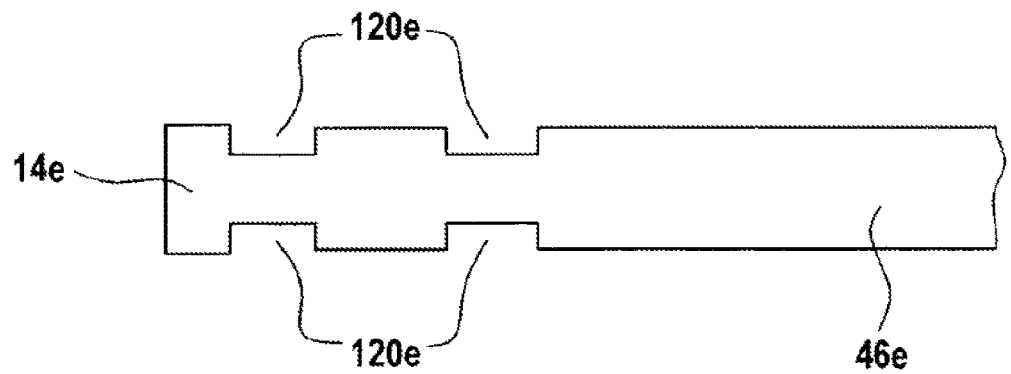
FIG. 14 shows a plan view of a wiper arm adapter unit of the wiper arm in a schematic view.

FIG. 12 shows a wiper device having a wiper blade adapter unit 10e and an adapter wind deflector unit 18e. The wiper blade adapter unit 10e comprises a wiper blade adapter base member 16e. The wiper blade adapter base member 16e has a base region 88e.

Moreover, the wiper blade adapter base member 16e comprises a receiver region 90e. The receiver region 90e is configured integrally with the base region 88e. The receiver region 90e of the wiper blade base adapter 16e has two side walls 56e, 58e arranged parallel to one another. The side walls 56e, 58e have in each case a main plane of extension parallel to a longitudinal direction 30e and perpendicular to a wiping direction 38e. The side walls 56e, 58e of the receiver region 90e protrude in each case perpendicular from a base region 88e. In this case, the first side wall 56e facing a leeward side 42e, viewed in the wiping direction 38e, is directly adjacent to an outer edge of the base region 88e. The second side wall 58e is, however, arranged in the vicinity of a wiper blade adapter center 40e of the wiper blade adapter base member 16e. The wiper blade adapter center 40e of the wiper blade adapter base member 16e is formed by a geometric mid-point of the wiper blade adapter base member 16e. Moreover, the receiver region 90e comprises two circular projections 112e, 114e. One projection 112e is arranged on an inner face of the first side wall 56e and one projection 114e is arranged on an inner face of the second side wall 58e. The projections 112d, 114d in each case have two opposing interrupted portions 116e, 118e. The two interrupted portions 116e, 118e are arranged in a plane perpendicular to the longitudinal direction 30e. Moreover, in each case the projections 112e, 114e are arranged exactly opposite one another. Moreover, the wiper blade adapter base member 16e comprises a wiper arm receiver 36e. The wiper arm receiver 36e is arranged in the receiver region 90e of the wiper blade adapter base member 16e. The wiper arm receiver 36e is partially formed by the projections 112e, 114e. The projections 112e, 114e serve for receiving the wiper arm adapter unit 14e of the wiper arm 46e. To this end, the wiper arm adapter unit 14e, viewed in a plane parallel to the longitudinal direction 30e and parallel to the wiping direction 38c, has four recesses 120e, wherein in each case two are arranged on one side. The recesses 120e of one side in each case are located exactly opposite the recesses 120e of the other side. The recesses 120e in each case are configured on the edge of the wiper arm adapter unit 14e. The wiper arm adapter unit 14e may be pushed, perpendicular to the longitudinal direction 30e, into the interrupted portions 116e, 118e of the projections 112e, 114e. Subsequently, the wiper arm adapter unit 14e may be pushed over the projections 112e, 114e by rotating in the region of the recesses 120e and thus secured. Subsequently, the wiper arm adapter base member 16e may be covered by the adapter wind deflector unit 18e, and thus the wiper arm adapter unit 14e may be retained in the wiper arm adapter base member 16e. The wiper arm receiver 36e, viewed in the wiping direction 38e, is arranged offset from the wiper blade adapter center 40e. The wiper arm receiver 36e is arranged offset in the direction of a leeward side 42e of the adapter wind deflector unit 18e. More specifically, a geometric mid-point of the wiper arm receiver 36e is arranged offset from the wiper blade adapter center 40e. The geometric mid-point of the wiper arm receiver 36e is arranged offset in the leeward direction from a plane which extends perpendicular to the wiping direction 38e and through the wiper blade adapter center 40e (FIG. 12, 13, 14).

Figure 15:
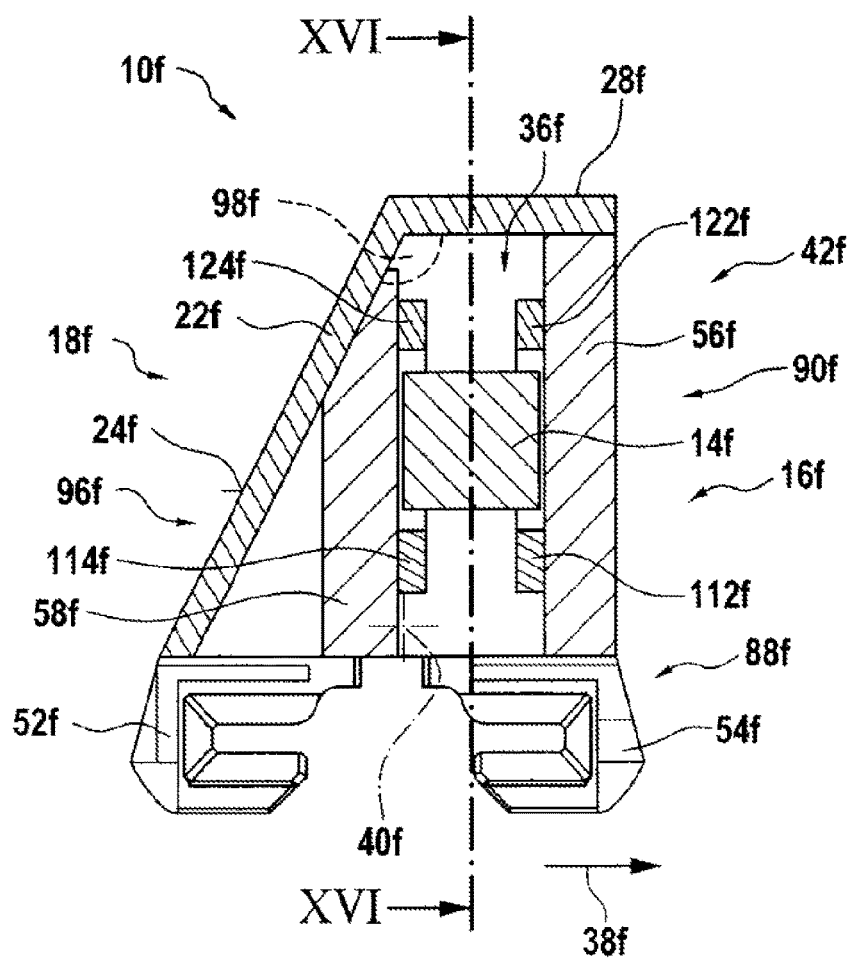
FIG. 15 shows a further alternative wiper device according to the invention having a wiper blade adapter unit and a wiper arm in a schematic partially sectional view along the cutting line XV.
Figure 16:
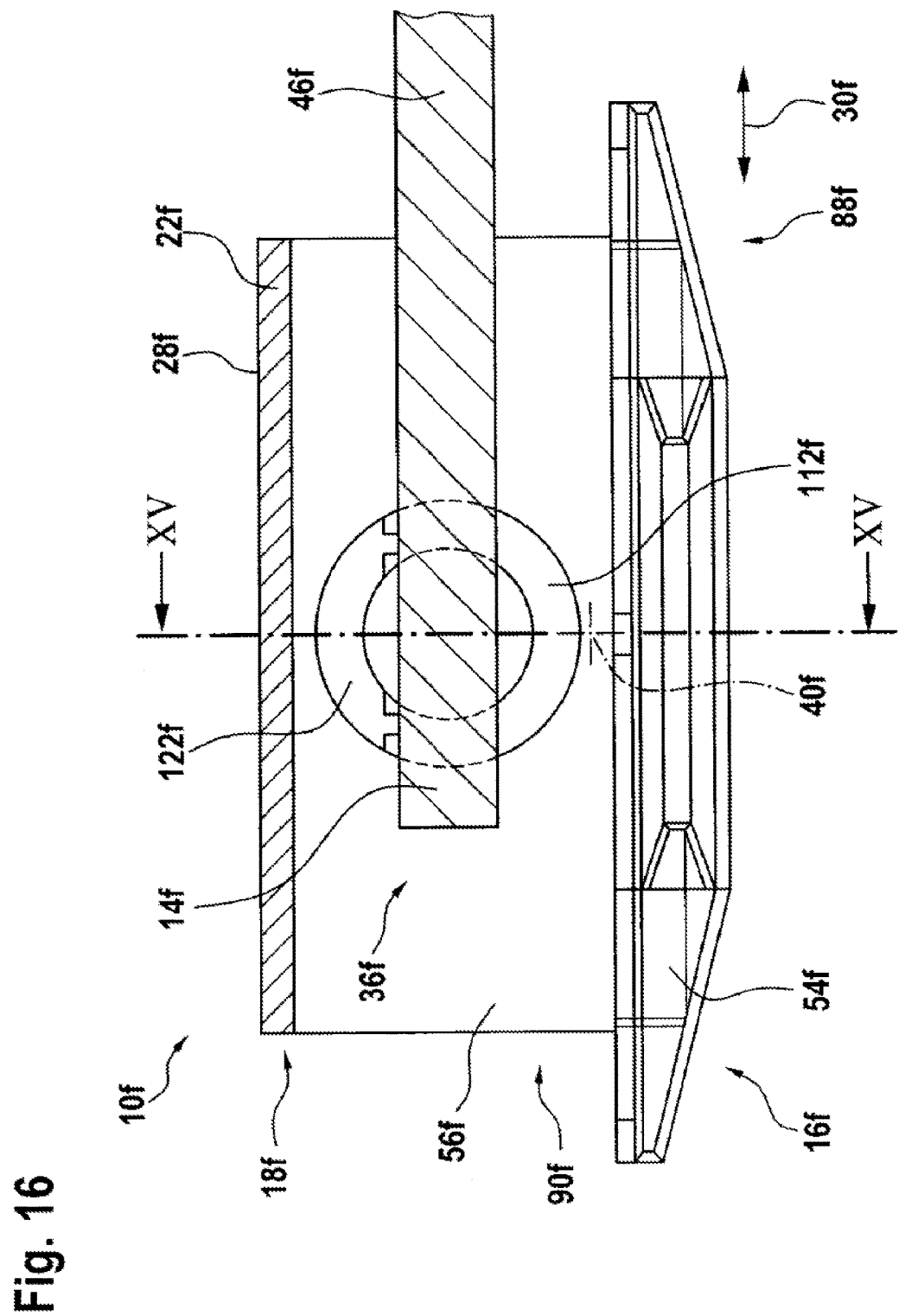
FIG. 16 shows the further alternative wiper device according to the invention having the wiper blade adapter unit and the wiper arm in a further schematic partially sectional view along the cutting line XVI.
Figure 17:
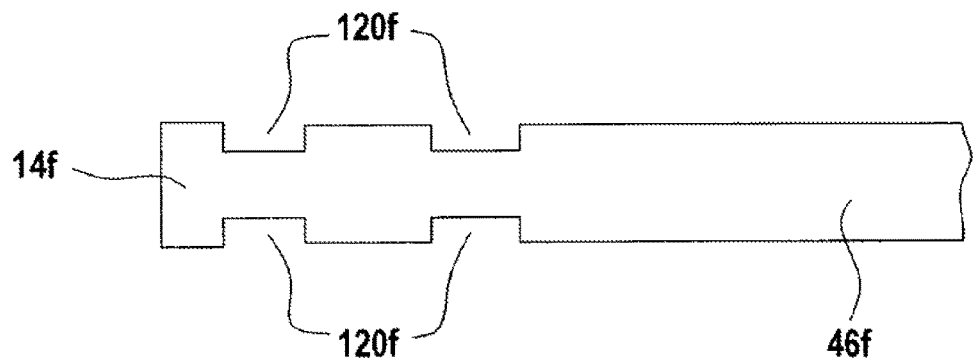
FIG. 17 shows a plan view of a wiper arm adapter unit of the wiper am in a schematic view.

FIG. 15 shows a wiper device comprising a wiper blade adapter unit 10f and an adapter wind deflector unit 18f. The wiper blade adapter unit 10f comprises a wiper blade adapter base member 16f. The wiper blade adapter base member 16f has a base region 88f.

Moreover, the wiper blade adapter base member 16f has a receiver region 90f. The receiver region 90f is integrally formed with the base region 88f. The receiver region 90f of the wiper blade base adapter 16f has two side walls 56f, 58f arranged parallel to one another. The side walls 56f, 58f have in each case a main plane of extension parallel to a longitudinal direction 30f and perpendicular to a wiping direction 38f. The side walls 56f, 58f of the receiver region 90f in each case protrude perpendicular from a base region 88f. In this case, the first side wall 56f facing a leeward side 42f is directly adjacent to an outer edge of the base region 88f, viewed in the wiping direction 38f. The second side wall 58f is, however, arranged in the vicinity of a wiper blade adapter center 40f of the wiper blade adapter base member 16f. The wiper blade adapter center 40f of the wiper blade adapter base member 16f is formed from a geometric mid-point of the wiper blade adapter base member 16f. Moreover, the receiver region 90f has two circular projections 112f, 114f. One projection 112f is arranged on an inner face of the second side wall 56f and one projection 114f is arranged on an inner face of the second side wall 58f. The projections 112f, 114f in each case have an interrupted portion 116f remote from the base region. Moreover, in each case the projections 112f, 114f are arranged exactly opposite one another. Moreover, the wiper blade adapter base member 16f comprises a wiper arm receiver 36f. The wiper arm receiver 36f is arranged in the receiver region 90f of the wiper blade adapter base member 16f. The wiper arm receiver 36f is partially formed by the projections 112f, 114f. The projections 112f, 114f serve for receiving the wiper arm adapter unit 14f of the wiper arm 46f. To this end, the wiper arm adapter unit 14f has four recesses 120f, in a plane parallel to the longitudinal direction 30f and viewed parallel to the wiping direction 38f, wherein in each case two thereof are arranged on one side. The recesses 120f of one side are respectively located exactly opposite the recesses 120f of the other side. The recesses 120f are in each case configured on the edge of the wiper arm adapter unit 14f. The wiper arm adapter unit 14f may be inserted into the interrupted portions 116f of the projections 112f, 114f, so that the recesses 120f are pushed over the projections 112f, 114f. Subsequently, the interrupted portions 116f of the projections 112f, 114f are covered by covers 122f, 124f. The covers 122f, 124f are in this case latched to the projections 112f, 114f and secure the wiper arm adapter unit 14f. In principle, the covers 122f, 124f may also be configured integrally with the adapter wind deflector unit 18f. The wiper arm receiver 36f, viewed in the wiping direction 38f, is arranged offset from the wiper blade adapter center 40f. The wiper arm receiver 36f is arranged offset in the direction of a leeward side 42f of the adapter wind deflector unit 18f. More specifically a geometric mid-point of the wiper arm receiver 36f is arranged offset from the wiper blade adapter center 40f. The geometric mid-point of the wiper arm receiver 36f is arranged offset in the leeward direction from a plane which extends perpendicular to the wiping direction 38f and through the wiper blade adapter center 40f (FIG. 15, 16, 17).

Figure 18:
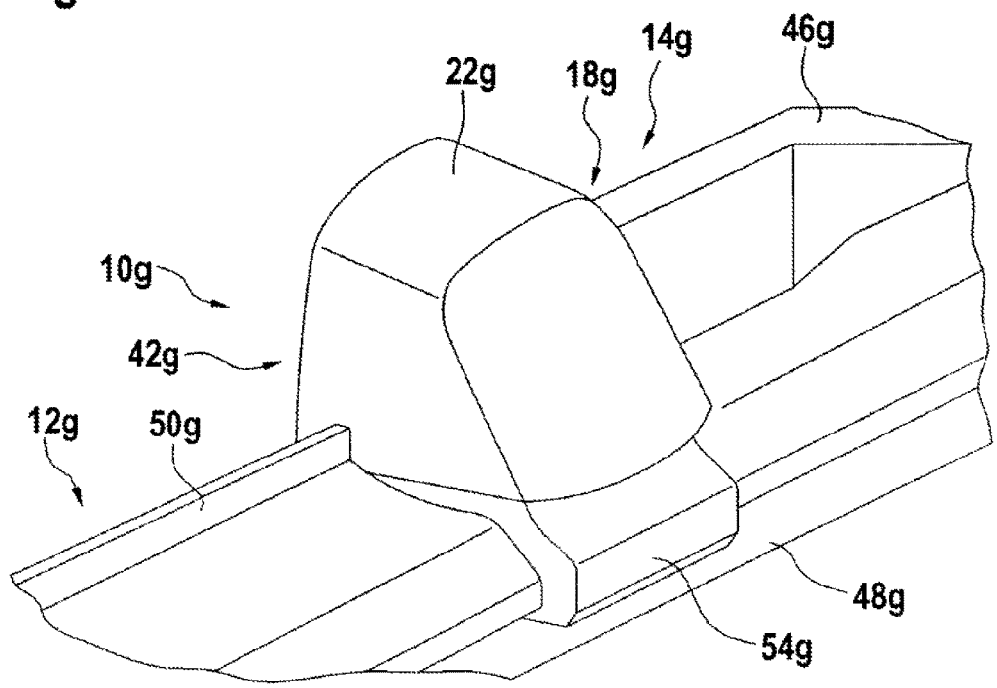
FIG. 18 shows a further alternative wiper device according to the invention having a wiper blade adapter unit and a wiper arm in a perspective view.

In FIG. 18, a further exemplary embodiment is shown of a wiper device with a wiper blade adapter unit 10g. The wiper blade adapter unit 10g is provided for a releasable coupling of a wiper blade 12g to a wiper arm adapter unit 14g. The wiper blade adapter unit 10g is arranged on the wiper blade 12g. The wiper arm adapter unit 14g is fixedly coupled to a wiper arm 46g. The wiper blade 12g has a wiper lip 48g, a wiper blade spoiler 50g and two spring rails, not visible further. The wiper device comprises an adapter wind deflector unit 18g. The adapter wind deflector unit 18g is provided to deflect incident air and to press the wiper blade 12g against a vehicle windscreen.

The wiper blade unit 10g comprises a wiper blade adapter base member 16g. The wiper blade adapter base member 16g is able to be connected fixedly to the wiper blade 12g. In other words, the wiper blade adapter base member 16g is unreleasably coupled to the wiper blade 12g. The wiper blade adapter base member 16g is shown in more detail in FIGS. 19-21. The wiper blade adapter base member 16g has claw-like spring rail retaining elements 52g, 54g which are provided to encompass a spring rail unit of the wiper blade 12g, not shown in further detail. The wiper blade adapter base member 16g comprises a wiper arm receiver 36g. The wiper arm receiver 36g is of U-shaped configuration. The wiper arm receiver 36g has two side walls 56g, 58g. The side walls 56g, 58g have in each case a wiper arm longitudinal securing device 60g, 62g. The wiper arm longitudinal securing devices 60g, 62g are configured as U-shaped recesses. A fastening pin 64g of the wiper arm adapter unit 14g of complementary shape is able to be inserted in the wiper arm longitudinal securing devices 60g, 62g. The wiper arm receiver 36g, viewed in a wiping direction 38g, is arranged offset from a wiper blade adapter center 40g. More specifically, a geometric mid-point of the wiper arm receiver 36g is arranged offset from the wiper blade adapter center 40g. The wiper arm receiver 36g is arranged offset in the direction of a leeward side 42g of the adapter wind deflector unit 18g.

The adapter wind deflector unit 18g is integrally formed with a part of the wiper blade adapter unit 10g. In this case, the adapter wind deflector unit 18g comprises an adapter cover element 22g. The adapter cover element 22g forms a cover of the wiper blade adapter base member 16g. The adapter cover element 22g is thus provided to cover the wiper blade adapter base member 16g to a large extent. The adapter cover element 22g is in this case cap-shaped. Moreover, the adapter cover element 22g is produced from a plastics material.

Figure 19:
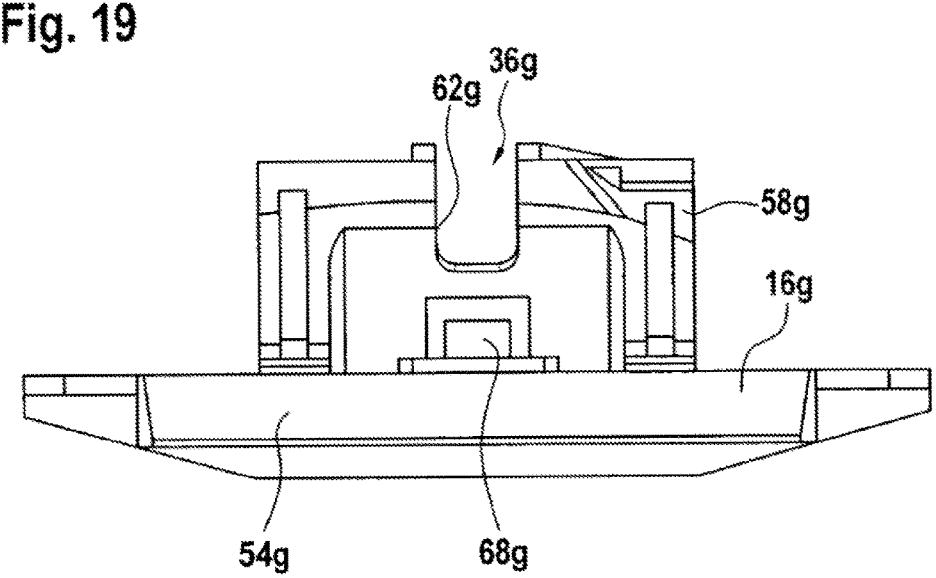
FIG. 19 shows a wiper blade adapter base member of the wiper device according to FIG. 18 in a side view.
Figure 20:
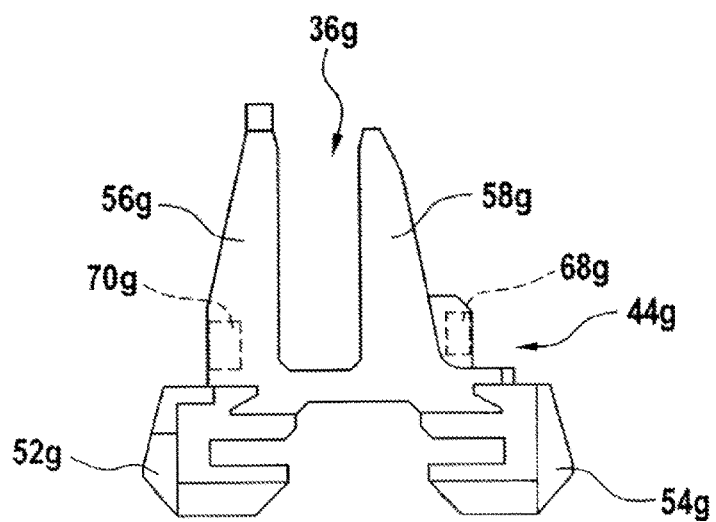
FIG. 20 shows the wiper blade adapter base member of the wiper device according to FIG. 18 in a front view.
Figure 21:
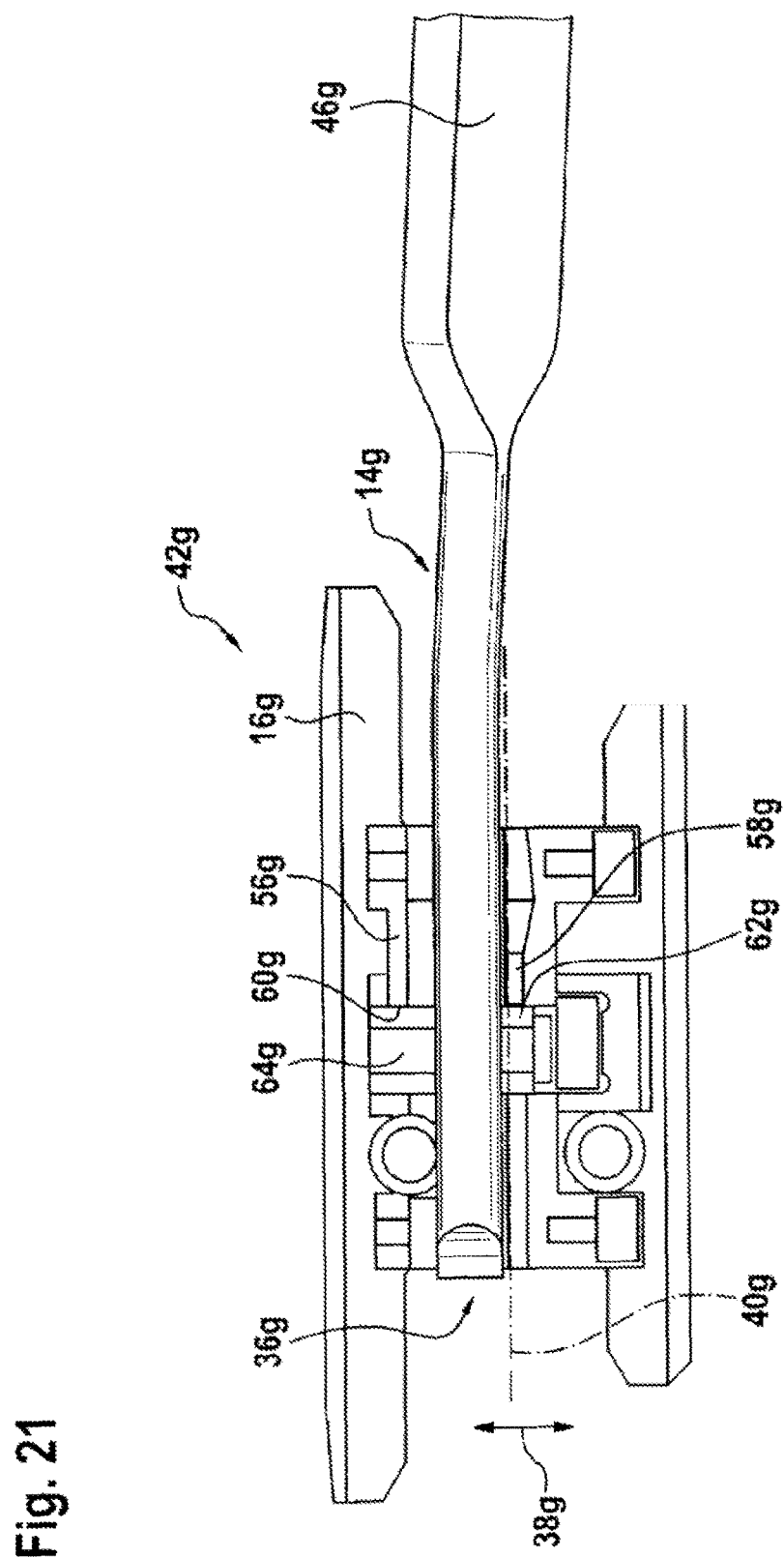
FIG. 21 shows the wiper blade adapter bade member of the wiper device according to FIG. 18 and the wiper arm in a plan view.
Figure 22:
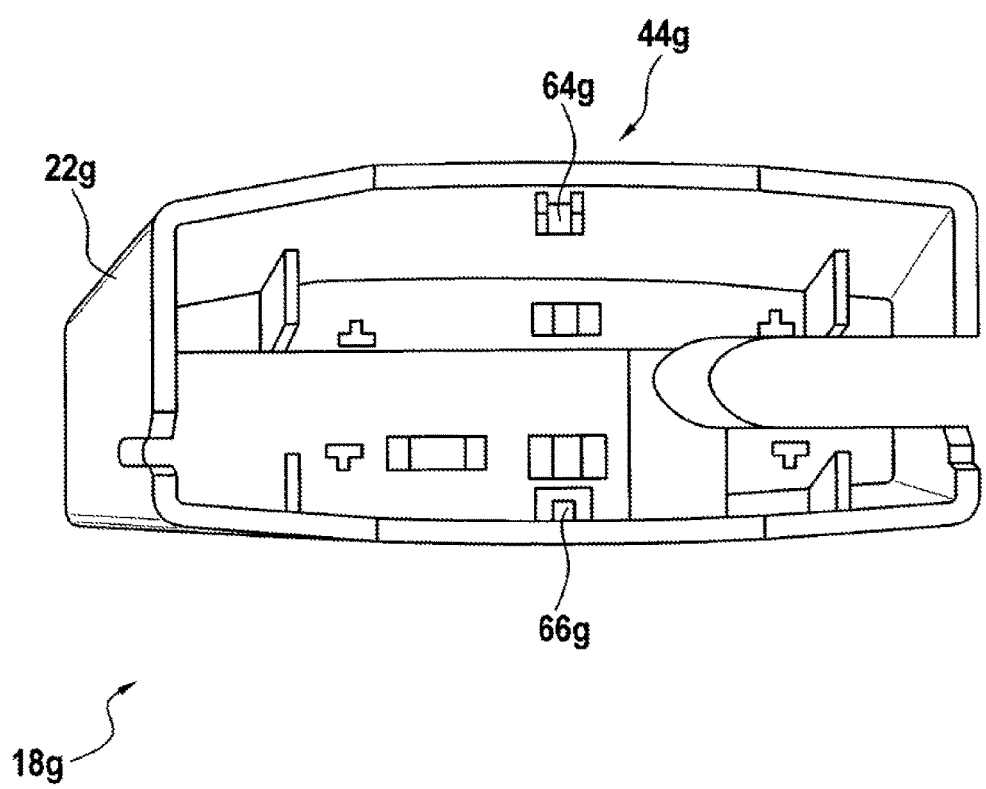
FIG. 22 shows an adapter wind deflector unit of the wiper device according to FIG. 18 in a view from below.

The adapter wind deflector unit 18g is provided for releasable fastening to the wiper blade adapter base member 16g. To this end, the wiper device comprises a latching unit 44g which is provided to latch the adapter wind deflector unit 18g to the wiper blade adapter unit 10g. To this end, the latching unit 44g comprises two latching means 64g, 66g as shown in FIG. 22. The latching means 64g, 66g are integrally formed with the adapter cover element 22g. The latching means 64g, 66g are provided to be resiliently deflected from an initial position during a mounting procedure and to be resiliently moved back into the initial position when a final mounted position is reached. When a final mounted position is reached, the latching means 64g, 66g engage in corresponding latching recesses 68g, 70g of the latching unit 44g. The latching recesses 68g, 70g are arranged in the wiper blade adapter base member 16g, as shown in FIGS. 19 and 20.

Figure 23:
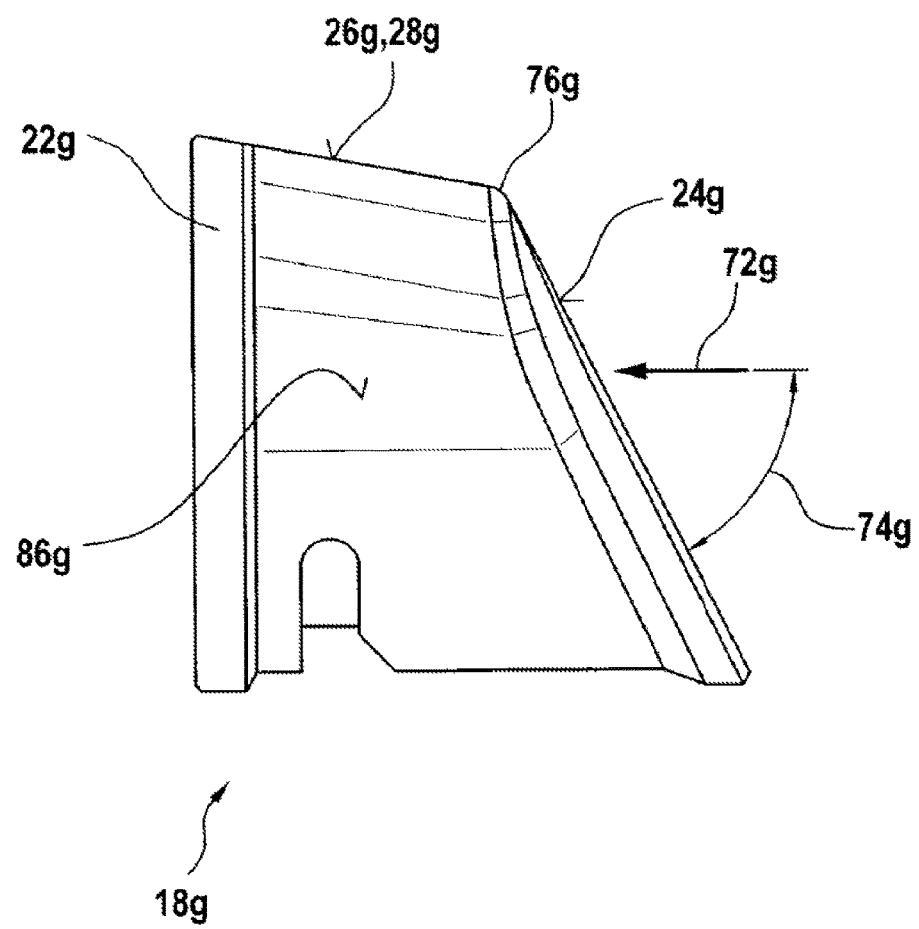
FIG. 23 shows the adapter wind deflector unit according to FIG. 22 in a front view.

Hereinafter further reference is made to the geometric design of the adapter wind deflector unit 18g, as is shown in particular in FIGS. 23 and 24. The adapter wind deflector unit 18g has an upper face 28g. The upper face 28g is remote from the wiper lip. The upper face 28g is curved in a slightly convex manner.

Moreover, the adapter wind deflector unit 18g has a first wind deflection surface 24g. The first wind deflection surface 24g guides air, which flows in a main flow direction 72g, in the direction of the upper face 28g. In this case, the first wind deflection surface 24g produces a contact force in the direction of the vehicle windscreen. The main direction of incidence 72g meets the first wind deflection surface 24g at an internal angle of incidence 74g of a maximum of 70°. In the exemplary embodiment shown, the angle of incidence 74g is approximately 65°. The first wind deflection surface 24g and the upper face 28g enclose an internal angle of at least 110°. More specifically, the first wind deflection surface 24g and the upper face 28g enclose an internal angle of approximately 125°. The adapter wind deflector unit 18g has a second wind deflection surface 26g. In this exemplary embodiment, the second wind deflection surface 26g is formed by the upper face 28g. The second wind deflection surface 26g is adjacent to the first wind deflection surface 24g. The first wind deflection surface 24g and the second wind deflection surface 26g are adjacent to one another on one edge 76g.

Figure 24:
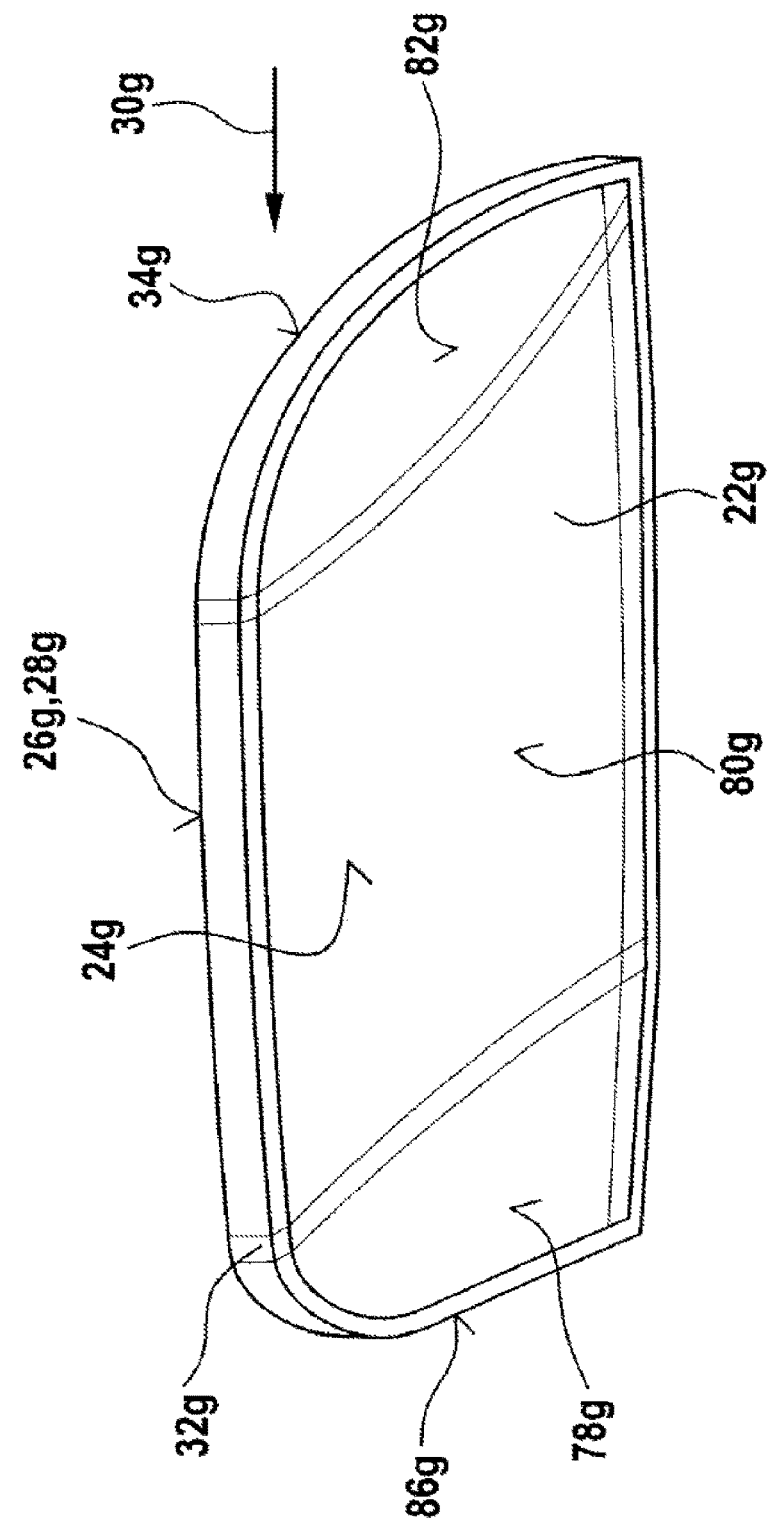
FIG. 24 shows the adapter wind deflector unit according to FIG. 22 in a side view.

As shown in FIG. 24, the first wind deflection surface 24g has three surface portions 78g, 80g, 82g. The three surface portions 78g, 80g, 82g form together a slightly convex curvature. The convex curvature extends in this case about an axis of curvature which extends at least substantially perpendicular to the vehicle windscreen to be wiped. The adapter wind deflector unit 18g further comprises a longitudinal flow surface 34g. The longitudinal flow surface 34g is provided to deflect air flowing at least substantially in a longitudinal direction 30g in order to press the wiper blade 12g against the vehicle windscreen. The longitudinal flow surface 34g is provided to conduct air to the upper face 28g. The longitudinal flow surface 34g in this case runs into the upper face 28g. The longitudinal flow surface 34g is curved in a highly convex manner. More specifically, the longitudinal flow surface 34g is curved by approximately 90°. The longitudinal flow surface 34g is oriented in the direction of a wiper blade inner circular path, not shown in more detail.

The adapter wind deflector unit 18g has a projection 32g on an upper face 28g, viewed in the longitudinal direction 30g. The projection 32g with a rear face 86g which is remote from the longitudinal flow surface 34g encloses an acute angle with the vehicle windscreen to be wiped. Air flowing in the longitudinal direction 30g thus initially strikes the longitudinal flow surface 34g. Subsequently, the air flows over the upper face 28g. Air turbulence is finally produced behind the projection 32g. As a result, suction is generated on the rear face 86g which is oriented toward the vehicle windscreen. Thus an additional contact force of the wiper blade 12g is produced in the direction of the vehicle windscreen.

Figure 25:
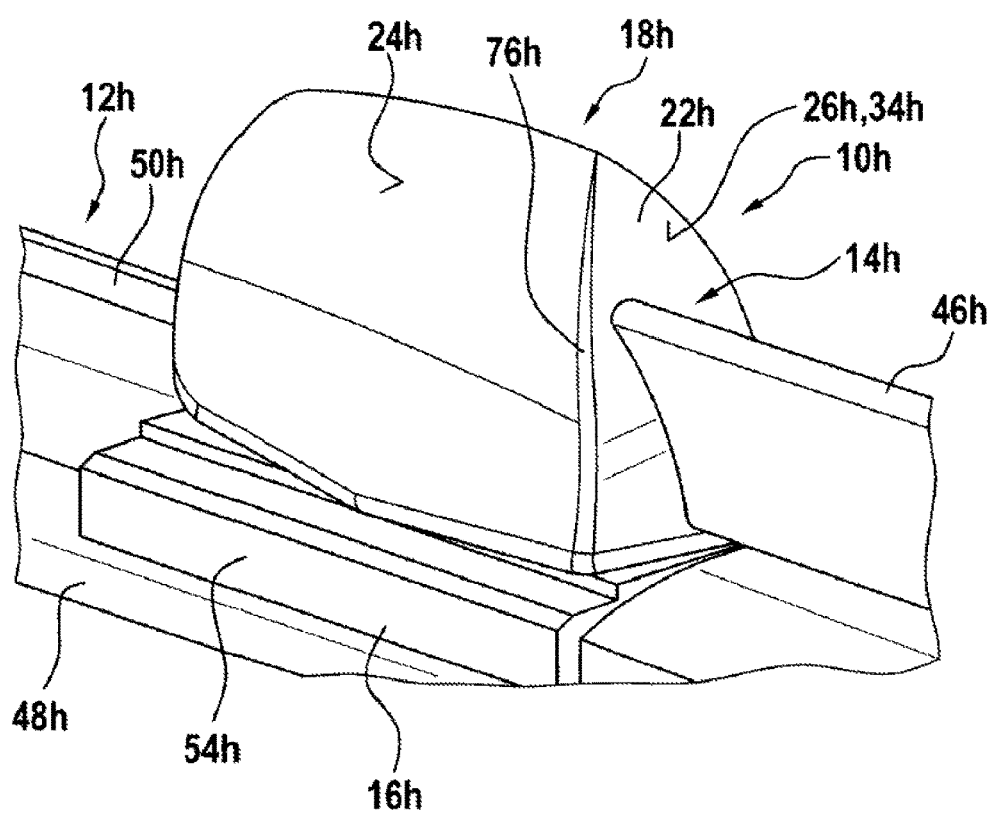
FIG. 25 shows a further alternative wiper device according to the invention having a wiper blade adapter unit and a wiper arm in a perspective view.
Figure 26:
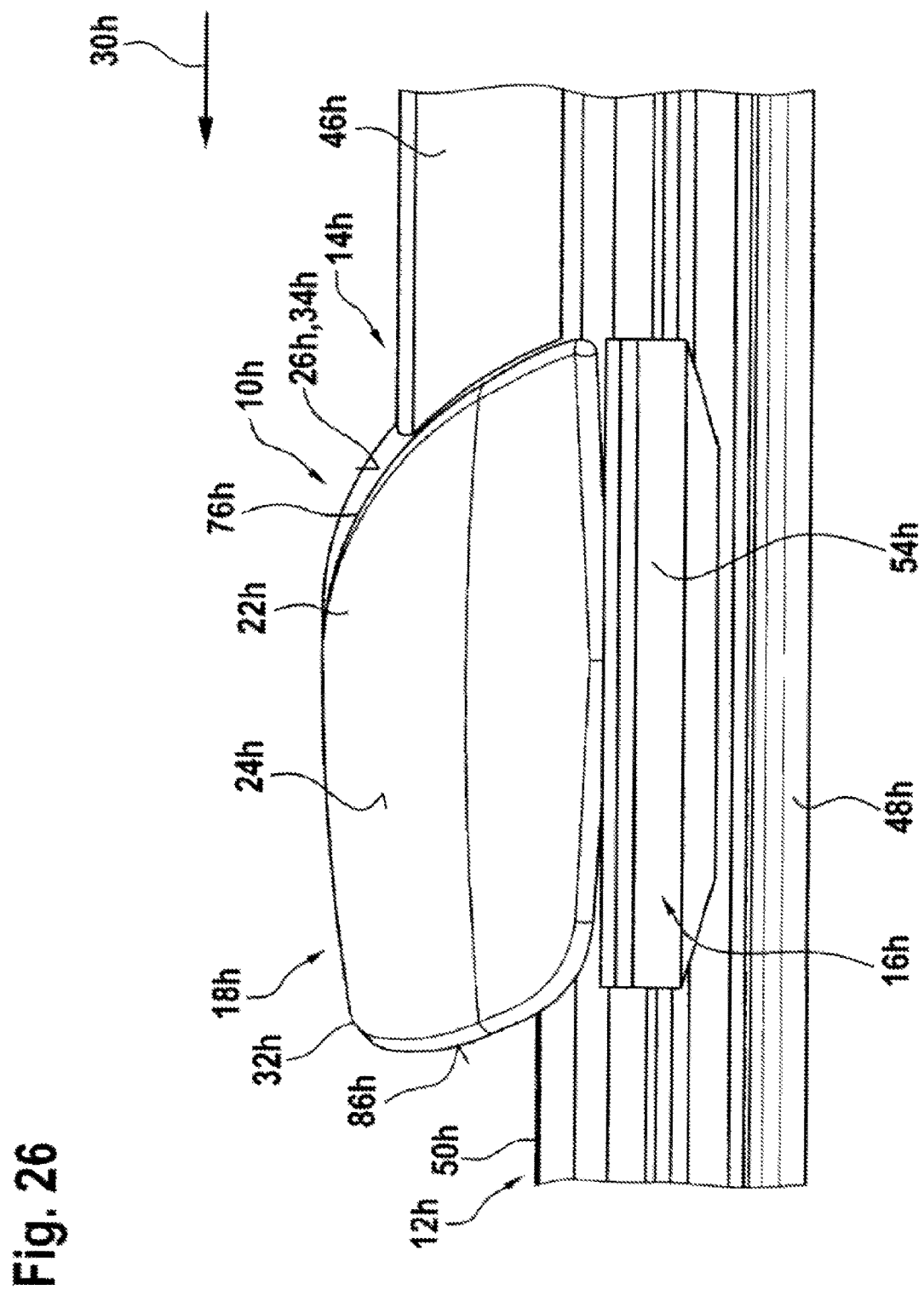
FIG. 26 shows the wiper device according to FIG. 25 in a side view.
Figure 27:
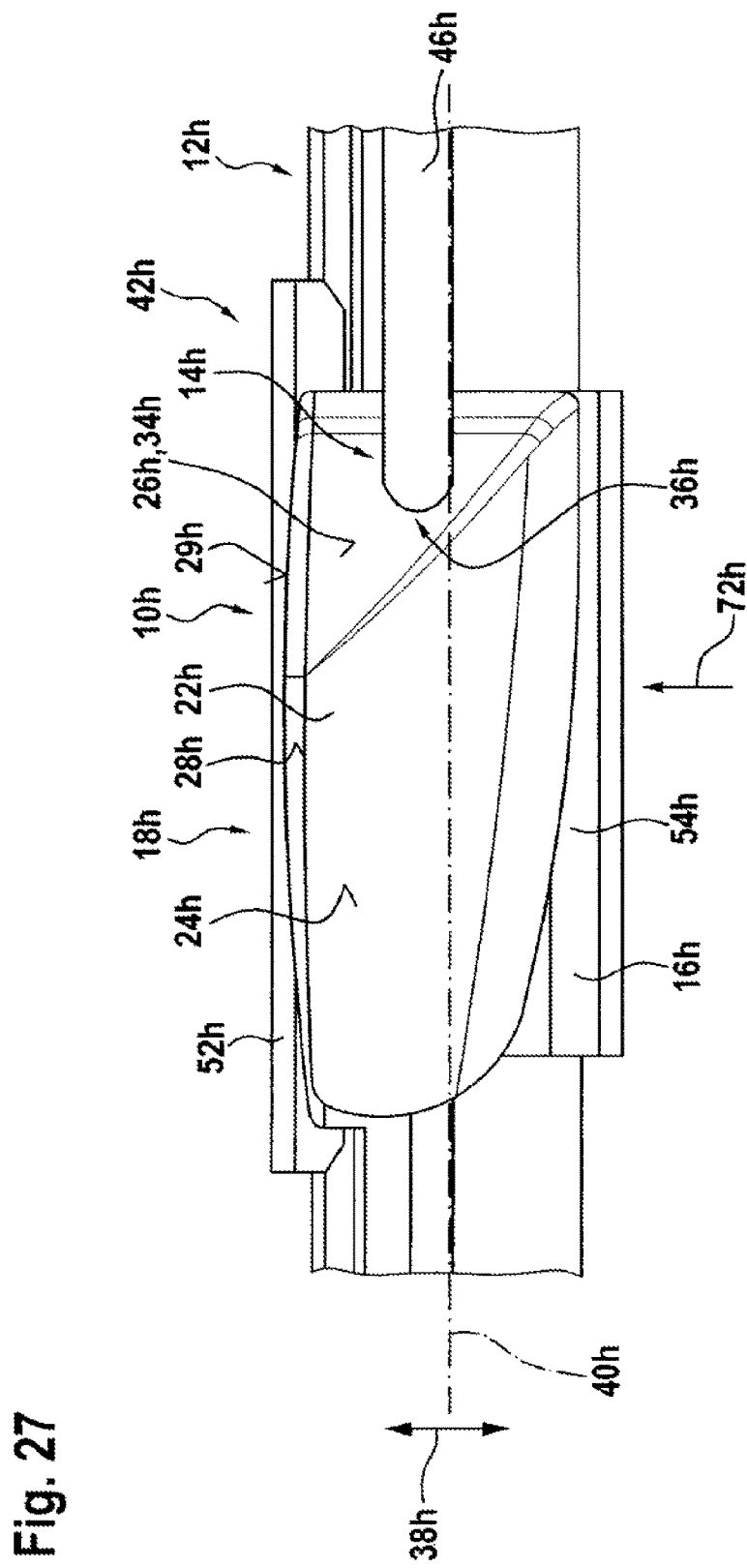
FIG. 27 shows the wiper device according to FIG. 25 in a plan view.

In FIGS. 25 to 27 a further exemplary embodiment is shown of a wiper device having a wiper blade adapter unit 10h. The wiper blade adapter unit 10h is provided for a releasable coupling of a wiper blade 12h to a wiper arm adapter unit 14h. The wiper arm adapter unit 14h is fixedly coupled to a wiper arm 46h. The wiper blade adapter unit 10h is arranged on the wiper blade 12h. The wiper blade 12h has a wiper lip 48h, a wiper blade spoiler 50h and two spring rails, not visible further. The wiper device comprises an adapter wind deflector unit 18h. The adapter wind deflector unit 18h is provided to deflect incident air and to press the wiper blade 12h against a vehicle windscreen.

The wiper blade unit 10h comprises a wiper blade adapter base member 16h. The wiper blade adapter base member 16h is able to be fixedly connected to the wiper blade 12h. In other words, the wiper blade adapter base member 16h is unreleasably coupled to the wiper blade 12h. The wiper blade adapter base member 16h has claw-like spring rail retaining elements 52h, 54h which are provided to encompass a spring rail unit of the wiper blade 12h, not shown in more detail. The wiper blade adapter base member 16h comprises a wiper arm receiver 36h. The wiper arm receiver 36h, viewed in a wiping direction 38h, is arranged offset from a wiper blade adapter center 40h. More specifically, a geometric mid-point of the wiper arm receiver 36h is arranged offset from the wiper blade adapter center 40h. The wiper arm receiver 36h is arranged offset in the direction of a leeward side 42h of the adapter wind deflector unit 18g.

The adapter wind deflector unit 18h is configured integrally with a part of the wiper blade adapter unit 10h. In this case, the adapter wind deflector unit 18h comprises an adapter cover element 22h. The adapter cover element 22h forms a cover of the wiper blade adapter base member 16h. The adapter cover element 22h is thus provided to cover the wiper blade adapter base member 16h to a large extent.

The adapter cover element 22h is in this case of cap-shaped configuration. Moreover, the adapter cover element 22h is produced from a plastics material. The adapter wind deflector unit 18h is provided for releasable fastening to the wiper blade adapter base member 16h.

Hereinafter, further reference is made to the geometric design of the adapter wind deflector unit 18h. The adapter wind deflector unit 18h has an upper face 28h. The upper face 28h is remote from the wiper lip. One dimension of the upper face in the wiping direction is less than 5 mm, preferably less than 2 mm. The upper face 28h is thus configured in the shape of an edge. The upper face 28h is configured to be curved in a convex manner.

Moreover, the adapter wind deflector unit 18h comprises a first wind deflection surface 24h. The first wind deflection surface 24h conducts air which flows in a main direction of incidence 72h in the direction of the upper face 28h. In this case, the first wind deflection surface 24h produces a contact pressure in the direction of the vehicle windscreen. The first wind deflection surface 24h has a convex curvature. The first wind deflection surface 24h and the upper face 28h enclose an internal angle of at least 110°. More specifically, the first wind deflection surface 24h and the upper face 28h enclose an internal angle of approximately 150°. The first wind deflection surface 24h forms an acute-angled contour with a rear face 29h. An edge portion between the first wind deflection surface 24h and the rear face 29h is formed in this case by the upper face 28h.

The adapter wind deflector unit 18h has a second wind deflection surface 26h. In this exemplary embodiment, the second wind deflection surface 26h is formed by a longitudinal flow surface 34h of the adapter wind deflector unit 18h. The second wind deflection surface 26h is adjacent to the first wind deflection surface 24h. The first wind deflection surface 24h and the second wind deflection surface 26h are adjacent to one another on one edge 76h.

The longitudinal flow surface 34h is provided to deflect air flowing at least substantially in a longitudinal direction 30h in order to press the wiper blade 12h against the vehicle windscreen. The longitudinal flow surface 34h is provided to conduct air to the upper face 28h. The longitudinal flow surface 34h in this case runs into the upper face 28h. The longitudinal flow surface 34h is curved in a highly convex manner. More specifically, the longitudinal flow surface 34h is curved by approximately 90°. The longitudinal flow surface 34h is oriented in the direction of a wiper blade inner circular path, not shown in more detail.

The adapter wind deflector unit 18h has a projection 32h on an upper face 28h, viewed in the longitudinal direction 30h. The projection 32h with a rear face 86h, which is remote from the longitudinal flow surface 34h, encloses an acute angle with the vehicle windscreen to be wiped. Air flowing in the longitudinal direction 30h thus initially strikes the longitudinal flow surface 34h. Subsequently, the air flows over the upper face 28h. Air turbulence is finally produced behind the projection 32h. As a result, suction is generated on the rear face 86h which is oriented toward the vehicle windscreen. Thus an additional contact force of the wiper blade 12h is produced in the direction of the vehicle windscreen.

Figure 28:
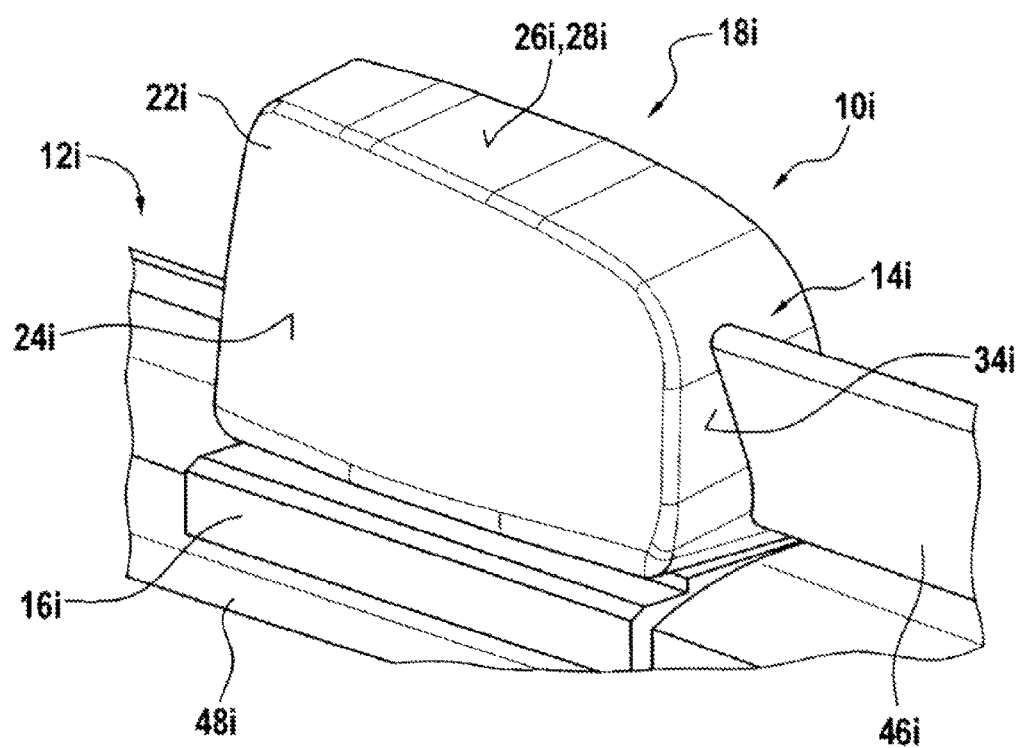
FIG. 28 shows a further alternative wiper device according to the invention having a wiper blade adapter unit and a wiper arm in a perspective view.

In FIGS. 28 to 30 a further exemplary embodiment is shown of a wiper device having a wiper blade adapter unit 10i. The wiper blade adapter unit 10i is provided for a releasable coupling of a wiper blade 12i to a wiper arm adapter unit 14i. The wiper arm adapter unit 14i is fixedly coupled to a wiper arm 46i. The wiper blade adapter unit 10i is arranged on the wiper blade 12i. The wiper blade 12i has a wiper lip 48i, a wiper blade spoiler 50i and two spring rails, not visible further. The wiper device comprises an adapter wind deflector unit 18i. The adapter wind deflector unit 18i is provided to deflect incident air and to press the wiper blade 12i against a vehicle windscreen.

The wiper blade unit 10i comprises a wiper blade adapter base member 16i. The wiper blade adapter base member 16i is able to be fixedly connected to the wiper blade 12i. In other words, the wiper blade adapter base member 16i is unreleasably coupled to the wiper blade 12i. The wiper blade adapter base member 16i has claw-like spring rail retaining elements 52i, 54i which are provided to encompass a spring rail unit of the wiper blade 12i, not shown in more detail. The wiper blade adapter base member 16i comprises a wiper arm receiver 36i. The wiper arm receiver 36i, viewed in a wiping direction 38i, is arranged offset from a wiper blade adapter center 40i. More specifically, a geometric mid-point of the wiper arm receiver 36i is arranged offset from the wiper blade adapter center 40i. The wiper arm receiver 36i, is arranged offset in the direction of a leeward side 42i of the adapter wind deflector unit 18g.

The adapter wind deflector unit 18i is integrally configured with a part of the wiper blade adapter unit 10i. In this case, the adapter wind deflector unit 18i has an adapter cover element 22i. The adapter cover element 22i forms a cover of the wiper blade adapter base member 16i. The adapter cover element 22i is thus provided to cover the wiper blade adapter base member 16i to a large extent. The adapter cover element 22i is in this case of cap-shaped configuration. Moreover, the adapter cover element 22i is produced from a plastics material. The adapter wind deflector unit 18i is provided for releasable fastening to the wiper blade adapter base member 16i.

Hereinafter further reference is made to the geometric design of the adapter wind deflector unit 18i. The adapter wind deflector unit 18i has an upper face 28i. The upper face 28i is remote from the wiper lip.

Moreover, the adapter wind deflector unit 18i has a first wind deflection surface 24i. The first wind deflection surface 24i conducts air, which flows in a main flow direction 72i, in the direction of the upper face 28i. In this case, the first wind deflection surface 24i produces a contact pressure in the direction of the vehicle windscreen. The first wind deflection surface 24i has a slightly convex curvature. The first wind deflection surface 24i and the upper face 28i enclose an internal angle of at least 110°. More specifically, the first wind deflection surface 24i and the upper face 28i enclose an internal angle of approximately 130°.

The adapter wind deflector unit 18i has a second wind deflection surface 26i. In this exemplary embodiment, the second wind deflection surface 26i is formed from the upper face 28i. The second wind deflection surface 26i is adjacent to the first wind deflection surface 24i. The first wind deflection surface 24i and the second wind deflection surface 26i are adjacent to one another on one edge 76i.

The adapter wind deflector unit 18i further comprises a longitudinal flow surface 34i. The longitudinal flow surface 34i is provided to deflect air flowing at least substantially in a longitudinal direction 30i, in order to press the wiper blade 12i against the vehicle windscreen. The longitudinal flow surface 34*i* is provided to conduct air to the upper face 28*i*. The longitudinal flow surface 34*i* in this case runs into the upper face 28*i*. The longitudinal flow surface 34*i* is curved in a slightly convex manner. More specifically, the longitudinal flow surface 34*i* is curved by approximately 45°. The longitudinal flow surface 34*i* is oriented in the direction of a wiper blade inner circular path, not shown in more detail.

The adapter wind deflector unit 18*i* has a projection 32*i* on an upper face 28*i*, viewed in the longitudinal direction 30*i*. The projection 32*i* with a rear face 86*i*, which is remote from the longitudinal flow surface 34*i*, encloses an acute angle with the vehicle windscreen to be wiped. Air flowing in the longitudinal direction 30*i* thus initially strikes the longitudinal flow surface 34*i*. Subsequently, the air flows over the upper face 28*i*. Air turbulence is finally produced behind the projection 32*i*. As a result, suction is generated on the rear face 86*i* which is oriented toward the vehicle windscreen. Thus an additional contact force of the wiper blade 12*i* is produced in the direction of the vehicle windscreen.

What is claimed is:

1. A wiper device comprising a wiper blade adapter unit (10*a*-10*i*) which is configured to releasably couple a wiper blade (12*a*-12*i*) to a wiper arm adapter unit (14*a*-14*i*) and which includes at least one wiper blade adapter base member (16*a*-16*i*) configured to be fixedly connected to the wiper blade (12*a*-12*i*), and an adapter wind deflector unit (18*a*-18*i*) configured to deflect incident air and to press the wiper blade (12*a*-12*i*) against a vehicle windscreen (20*a*), wherein the wiper blade adapter base member (16*a*-16*i*) includes a wiper arm receiver (36*a*-36*i*) in the form of a pin (92*a*) that extends in an elongate direction that is parallel to a wiping direction and that which, when viewed along a longitudinal direction (30*a*-30*i*) of the wiper blade adapter unit (10*a*-10*i*), is arranged offset from a plane that both passes through a wiper blade adapter unit center of gravity (40*a*-40*i*) and is perpendicular to the elongate direction of the pin, wherein the longitudinal direction is a direction that extends parallel to a main longitudinal dimension of the wiper blade (12*a*-12*i*) and perpendicular to the elongate direction of the pin, wherein the wiper blade adapter base member includes two side walls (56*a*, 58*a*), wherein the pin (92) extends between the two side walls, and wherein the wind deflector unit (18*a*) contacts an upper end of each the side walls, wherein the wiper blade base member (16*a*-16*i*) includes a base region (88*a*), wherein the first side wall (56*a*) extends a first distance from the base region (88*a*) along a vertical direction that is perpendicular to both the longitudinal direction (30*a*) and the elongate direction of the pin (92*a*), and the second side wall (58*a*) extends a second distance from the base region (88*a*) along the vertical direction, wherein the first distance is greater than the second distance.

2. The wiper device according to claim 1, characterized in that the adapter wind deflector unit (18*a*-18*i*) is releasably fastened to the wiper blade adapter base member (16*a*-16*i*).

3. The wiper device according to claim 1, characterized in that the adapter wind deflector unit (18*a*-18*i*) comprises at least one adapter cover element (22*a*-22*i*) which is configured to cover the wiper blade adapter base member (16*a*-16*i*) at least to a large extent.

4. The wiper device according to claim 1, characterized in that the adapter wind deflector unit (18*a*-18*i*) comprises at least one first wind deflection surface (24*a*-24*i*) and an upper face (28*a*-28*i*) which enclose an angle of at least 110°.

5. The wiper device according to claim 1, characterized in that the wiper arm receiver (36*a*-36*i*) is arranged offset from the wiper blade adapter center of gravity (40*a*-40*i*) in the direction of a leeward side (42*a*-42*i*) of the adapter wind deflector unit (18*a*-18*i*), wherein the leeward side is a side configured to be remote from a driving wind.

6. The wiper device according to claim 1, wherein the first side wall (56*a*) and a second side wall (58*a*) are arranged parallel to one another.

7. The wiper device according to claim 6, wherein the base region (88*a*) includes two claw-shaped spring rail retaining elements (52*a*, 54*a*) defining a longitudinal guide channel configured to receive a spring rail, wherein the first side wall (56*a*) and the second side wall (58*a*) each extend along the vertical direction and away from the longitudinal guide channel.

8. The wiper device according to claim 6, wherein the pin (92*a*) extends between the first side wall (56*a*) and the second side wall (58*a*) and is received in openings in the first side wall (56*a*) and the second side wall (58*a*).

* * * * *